US007740535B2

(12) United States Patent
Kido

(10) Patent No.: US 7,740,535 B2
(45) Date of Patent: Jun. 22, 2010

(54) ROULETTE GAMING MACHINE

(75) Inventor: Katsuhiro Kido, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 288 days.

(21) Appl. No.: 11/259,350

(22) Filed: Oct. 27, 2005

(65) Prior Publication Data

US 2006/0094493 A1 May 4, 2006

(30) Foreign Application Priority Data

Oct. 29, 2004 (JP) .......................... P2004-316057

(51) Int. Cl.
*A63F 9/24* (2006.01)
*A63F 13/00* (2006.01)

(52) U.S. Cl. .......................... 463/17; 463/25; 463/42

(58) Field of Classification Search .................... 463/1, 463/16–17, 20, 25, 29, 40–42; 273/138.1–2, 273/143 R See application file for complete search history.

(56) References Cited

U.S. PATENT DOCUMENTS 4,077,631 A 3/1978 Tela, Sr.
4,732,385 A 3/1988 Castellanos
4,906,005 A 3/1990 Manabe
5,634,639 A 6/1997 Tokito et al.
5,755,440 A 5/1998 Sher
5,775,993 A 7/1998 Fentz et al.
6,645,077 B2 * 11/2003 Rowe .......................... 463/42
6,890,255 B2 * 5/2005 Jarvis et al. .................. 463/17
2002/0090988 A1 * 7/2002 Frost et al. .................. 463/17
2002/0152120 A1 * 10/2002 Howington .................. 705/14
2003/0148804 A1 8/2003 Ikeya et al.
2003/0199308 A1 10/2003 Parker
2004/0053657 A1 * 3/2004 Fiden et al. .................. 463/16
2004/0072609 A1 4/2004 Ungaro et al.

(Continued)

FOREIGN PATENT DOCUMENTS

GB 2 322 217 8/1998

(Continued)

OTHER PUBLICATIONS

SpinGold PRO, Apr. 4, 2004, http://web.archive.org/web/20040404143447/http://spingold.com/pro.html.*

(Continued)

*Primary Examiner*—John M Hotaling, II
*Assistant Examiner*—Ryan Hsu
(74) *Attorney, Agent, or Firm*—McGinn IP Law Group, PLLC

(57) ABSTRACT

A roulette gaming machine includes: a roulette wheel on which marks are placed; a lottery unit for drawing a win mark; a bet area display unit for displaying a bet areas formed based on the same marks as the marks placed on the roulette wheel; a selection unit for selecting a bet area displayed on the bet area display unit; a bet unit for betting a game value on the bet area; a history storage unit for storing a lottery results as history data; a search condition selection unit for selecting a search condition concerning the win frequency of each mark; a search unit for searching the history data; and a conditional bet unit for betting a game value on the bet area corresponding to a search result of the search unit.

10 Claims, 18 Drawing Sheets

U.S. PATENT DOCUMENTS

| | | | | |
|---|---|---|---|---|
| 2004/0087357 | A1 * | 5/2004 | Johnson | 463/17 |
| 2004/0198484 | A1 | 10/2004 | Johnson | |
| 2005/0014562 | A1 * | 1/2005 | Fujimoto | 463/42 |
| 2005/0032570 | A1 * | 2/2005 | Ohira | 463/17 |
| 2005/0212210 | A1 * | 9/2005 | Ogiwara | 273/274 |
| 2006/0105830 | A1 * | 5/2006 | Nemitz et al. | 463/17 |

FOREIGN PATENT DOCUMENTS

| | | | |
|---|---|---|---|
| GB | 2321856 | A * | 8/1998 |
| JP | 09-140856 | | 6/1997 |
| JP | 2003-325726 | | 11/2003 |
| RU | 2 039 376 | C1 | 7/1995 |
| RU | 2 205 052 | C1 | 5/2003 |

OTHER PUBLICATIONS

Eurasian Search Report dated Mar. 27, 2006.

Official Notice from the Peruvian Patent Office with English Translation.

The brief of the opposition with partial English Translation.

Peru Government, “Normas Legales”, Official Journal “El Peruano”, pp. 238457-238458, Feb. 3, 2003 with partial English translation.

Peru Government, “Normas Legales”, Official Journal “El Peruano”, p. 193263, Sep. 24, 2000 with partial English translation.

Carlos Alberto Fonseca Sarmiento “Juegos de Azar y Apuesta. Aspectos Tecnicos y Legales”, pp. 47-68 with partial English translation.

European Search Report dated Feb. 22, 2006.

* cited by examiner

ROULETTE GAMING MACHINE

CROSS-REFERENCE TO THE RELATED APPLICATION(S)

This application is based upon and claims a priority from prior Japanese Patent Applications No. 2004-316057 filed on Oct. 29, 2004, the entire contents of which are incorporated herein by reference.

BACKGROUND OF THE INVENTION

1. Field of the Invention

This invention relates to a roulette gaming machine for enabling a player to bet based on a game result history, thereby increasing the variety of the game entertainment.

2. Description of the Related Art

A medal game using a medal as a game medium of a slot machine, a roulette game machine, a card game machine, etc., is a game that can be started by a player who purchases or borrow a plurality of medals with a medal lending machine and inputting the medal to the gaming machine. If the player wins the game, a predetermined number of medals are paid out to the player. Therefore, the player who can gain a large number of medals can enjoy a successive game without purchasing or borrowing new medals. Particularly, with a roulette gaming machine, the player bets a medal purchased or borrowed with a medal lending machine on a win-possible number, thereby playing a game.

In a related art, for the player to bet with the roulette gaming machine, a betting board displayed on a monitor display is used, as shown in JP-A-2003-325726. A plurality of numbers (containing also letters) as pattern characters containing the same numbers as the numbers displayed on a wheel are displayed on the betting board like squares. Using the betting board with the numbers arranged like squares thereon, the player predicts the number to bet on and bets a chip on the number.

However, the roulette gaming machine described in JP-A-2003-325726 is a gaming machine for the player to play a game according to a bet method involved in general roulette, and the player determines the mark to bet on by his or her decision. Often, the player uses the past win result in the roulette game as the decision material on determining the mark to bet on. That is, a large number of players make a decision that "the mark has not become a win mark recently and therefore will probably become a win mark in the next game" or that "the mark has often become a win mark recently and therefore will also probably become a win mark in the next game" from the past win result in the roulette game.

However, in the roulette gaming machine described in JP-A-2003-325726, the player can keep track of the game result only under player's eyes.

If the player keeps track of the game result and predicts the mark to bet on based on the winning frequency of the mark, 38 marks exist on the roulette wheel and thus a plurality of marks at the same degree of frequency as the frequency determined by the player can frequently occur. Therefore, in such a case, the player needs to search the betting wheel for the corresponding marks and then bet on each of the marks; the player must perform intricate operation. Usually, the mark mentioned here is assigned any of natural numbers of 0 to 36 (00 may be contained).

SUMMARY OF THE INVENTION

It is therefore an object of the invention to provide a roulette gaming machine for enabling a player to select a condition based on the win result history and bet on all marks meeting the condition by simple operation, thereby enabling the player to easily bet a chip for making it possible to increase the variety of the game entertainment and increase the game will of the player. Further, the roulette gaming machine enables the beginner who is unfamiliar with operation of the roulette gaming machine to easily bet based on the win result history.

To the end, according to the invention, there is provided a roulette gaming machine including: a roulette wheel on which a plurality of marks are placed; a lottery unit for drawing a win mark from the plurality of marks; a bet area display unit for displaying a plurality of bet areas formed based on the same marks as the plurality of marks placed on the roulette wheel; a selection unit for selecting a bet area displayed on the bet area display unit; and a bet unit for betting a game value on the bet area selected by the selection unit; a history storage unit for storing a plurality of lottery results as history data; a search condition selection unit for selecting a search condition concerning the win frequency of each mark; a search unit for searching the history data based on the search condition; and a conditional bet unit for betting a game value on the bet area corresponding to the search result of the search unit.

The roulette gaming according to the invention includes the history storage unit for storing a plurality of lottery results as history data; the search condition selection unit for the player to select a search condition concerning the win frequency of each mark; the search unit for searching the history data based on the search condition; and the conditional bet unit for betting a game value on the bet area corresponding to the search result of the search unit, so that the player can select the search condition concerning the win frequency of each mark and can bet a game value on the mark corresponding to the search condition by easy operation. Therefore, the variety of the game entertainment can be increased, so that the player does not lose interest in playing games. Even the beginner of the roulette gaming machine can easily bet in an easy-to-understand manner.

BRIEF DESCRIPTION OF THE DRAWINGS

These and other objects and advantages of the present invention will be more fully apparent from the following detailed description taken in conjunction with the accompanying drawings, in which.

DETAILED DESCRIPTION OF THE PREFERRED EMBODIMENTS

A roulette gaming machine 1 according to the invention will be discussed in detail with reference to the accompanying drawings based on an embodiment of a roulette gaming machine according to the invention.

The roulette gaming machine 1 is a gaming machine in which a player predicts the number, etc., determined with rotation of a roulette wheel and bets game media such as his or her owned medals on the predicted number, etc., and when the number, etc., on which the player bets becomes a win number, the player can receive payout of a predetermined number of medals.

Figure 1:
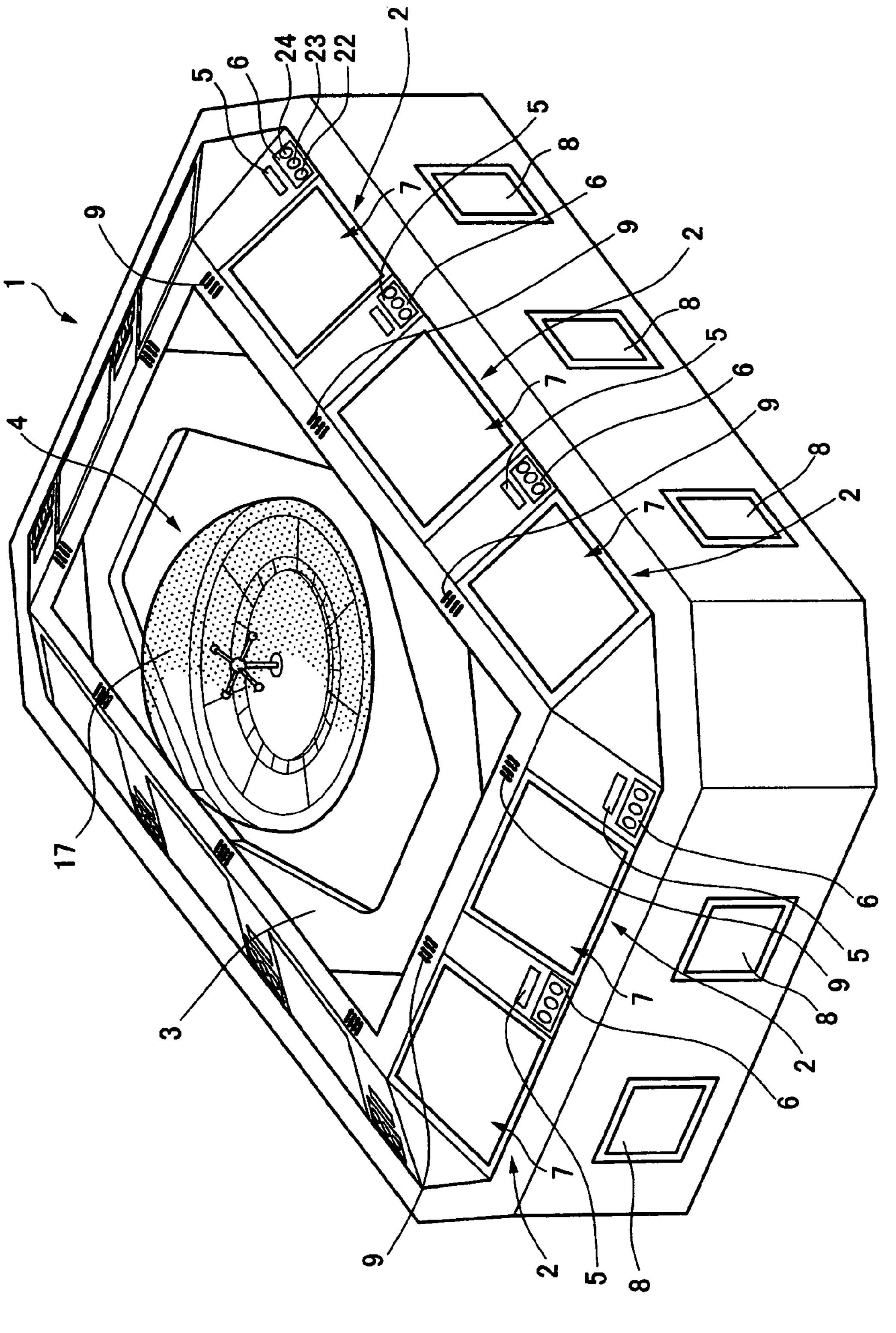
FIG. 1 is an external perspective view to show the schematic configuration of a roulette gaming machine according to an embodiment of the invention.

To begin with, the schematic configuration of the roulette gaming machine 1 according to the embodiment will be discussed based on FIG. 1. FIG. 1 is an external perspective view to show the schematic configuration of the roulette gaming machine 1 according to the embodiment.

As shown in FIG. 1, the roulette gaming machine 1 is basically made up of a cabinet 3 of a main body, a roulette wheel 4 provided roughly in the center of the top face of the cabinet 3, and a plurality of (in the embodiment, ten) satellites 2 placed so as to surround the roulette wheel 4.

The satellite 2 is as follows: One or more satellites 2 are installed for a medal gaming machine of a roulette gaming machine, a card gaming machine, etc., each to provide a game area where the player predicts the game result and bets a game medium such as a medal. The satellite 2 is made up of at least a medal acceptance unit 5 for inputting game media such as coins and medals used to play a game, a control section 6 made up of control buttons, etc., operated by a player entering predetermined commands, and an image display 7 for displaying an image involved in a game.

The player can operate the control section 6, etc., while seeing the image displayed on the image display 7, thereby advancing the developed game.

Medal payout openings 8 are provided on the sides of the cabinet 3 where the satellites 2 are installed. Further, a speaker 9 for producing music, effect sound, etc., is provided in the upper right portion of the image display 7 of each satellite 2.

Figure 2:
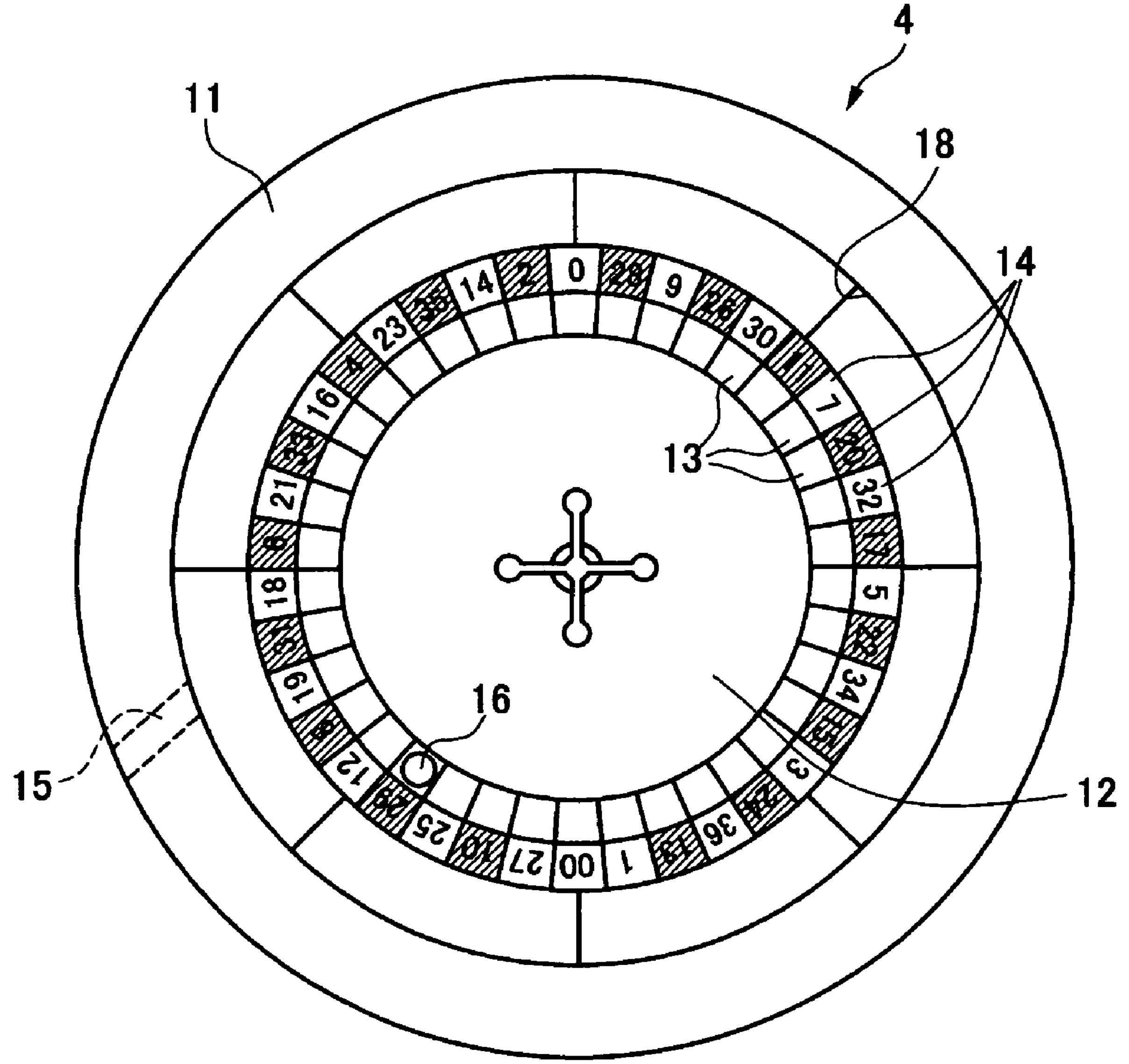
FIG. 2 is a plan view of a roulette wheel according to the embodiment of the invention.

Next, the configuration of the roulette wheel 4 according to the embodiment will be discussed with reference to FIG. 2. FIG. 2 is a plan view of the roulette wheel according to the embodiment.

As shown in FIG. 2, the roulette wheel 4 is basically made up of a frame 11 fixed to the cabinet 3 and a rotation disk 12 housed and supported in the inside of the frame 11 for rotation. The rotation disk 12 is formed on the top face with a large number of (in the embodiment, 38) concave ball housing grooves 13. Further, number indication plates 14 indicating numbers of 0, 00, and 1 to 36 as pattern characters in a one-to-one correspondence with the ball housing grooves 13 are formed on the top face of the rotation disk 12 in the outer direction of the ball housing grooves 13.

A ball input port 15 is formed in the frame 11. A ball input unit (not shown) is joined to the ball input port 15 and a ball 16 is input onto the rotation disk 12 from the ball input port 15 with drive of the ball input unit. The whole above the roulette wheel 4 is covered with a transparent acrylic cover member 17 shaped like a hemisphere.

The frame 11 is inclined gently to the inside and is formed in an intermediate portion with a guide wall 18 for guiding the input ball 16 against the centrifugal force and rolling the ball 16. As the rotation speed reduces and the centrifugal force is lost, the ball 16 rolls down the slope of the frame 11 and goes to the inside thereof and arrives at the rotating rotation disk 12.

The ball 16 rolls on the top of the rotation disk 12 and is housed in any ball housing groove 13 through the tops of the number indication plates 14 outside the rotating rotation disk 12. The number described on the number indication plate 14 corresponding to the ball housing groove 13 in which the ball 16 is housed becomes the win number.

A win determination unit (not shown) is installed below the roulette wheel 4 for determining which number the ball is housed in the ball housing groove 13 corresponding to. Further, a ball collection unit (not shown) is installed below the rotation disk 12 for collecting the ball 16 on the rotation disk 12 after each game is over. The ball input unit, the win determination unit, and the ball input unit are already known and therefore will not be discussed again in detail.

Next, the configurations of the control section 6 and the image display 7 according to the embodiment will be discussed.

The control section 6 is provided on the side of the image display 7 of the satellite 2 and buttons operated by the player are placed, as shown in FIG. 1. Specifically, a BET confirmation button 22, a payback (CASHOUT) button 23, and a help (HELP) button 24 are placed from the left to the right viewed from the position opposed to the satellite 2.

The BET confirmation button 22 is a button pressed by the player to confirm the bet after bet operation with the image display 7 described later. If the bet is confirmed and the player has bet on the number described on the number indication plate 14 corresponding to the ball housing groove 13 in which the ball 16 is housed on the roulette wheel 4 during the gaming, the player wins the game. If the player wins the game, the credit points responsive to the number of the bet chips are added to the current owned credit points of the player. The bet operation is described later in detail.

The payback button 23 is a button usually pressed by the player when the game is over. When the player presses the payback button 23, medals responsive to the current owned credit points of the player, gained by the games, etc., (usually, one medal to one credit point) are paid back to the player from the medal payout opening 8.

The help button 24 is a button pressed by the player if the player is unfamiliar with the game operation method, etc. When the player presses the help button 24, immediately a help screen indicating various pieces of operation information is displayed on the image display 7.

Figure 3:
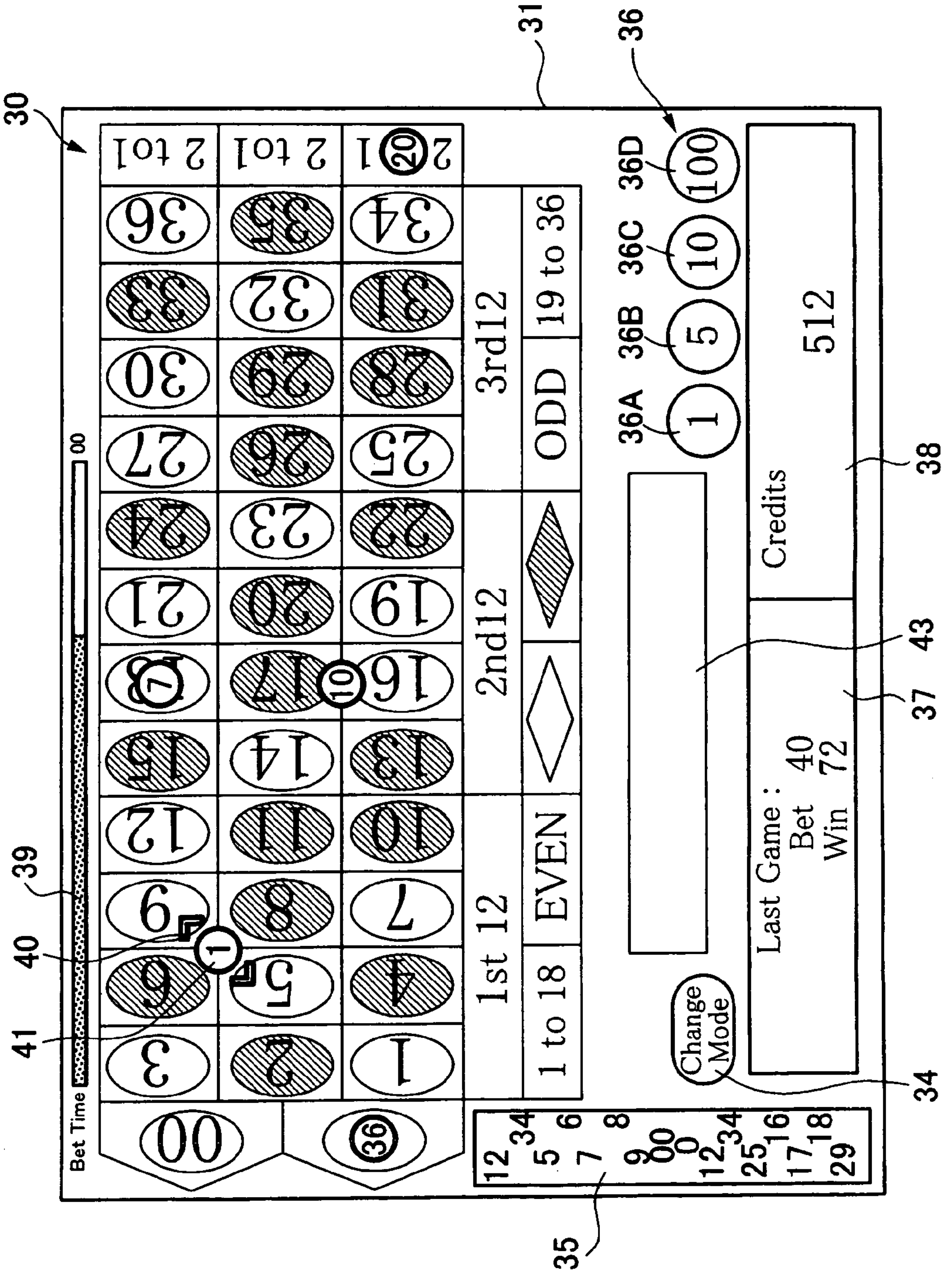
FIG. 3 is a schematic representation to show a first BET screen where a table betting board is displayed according to the embodiment of the invention.
Figure 6:
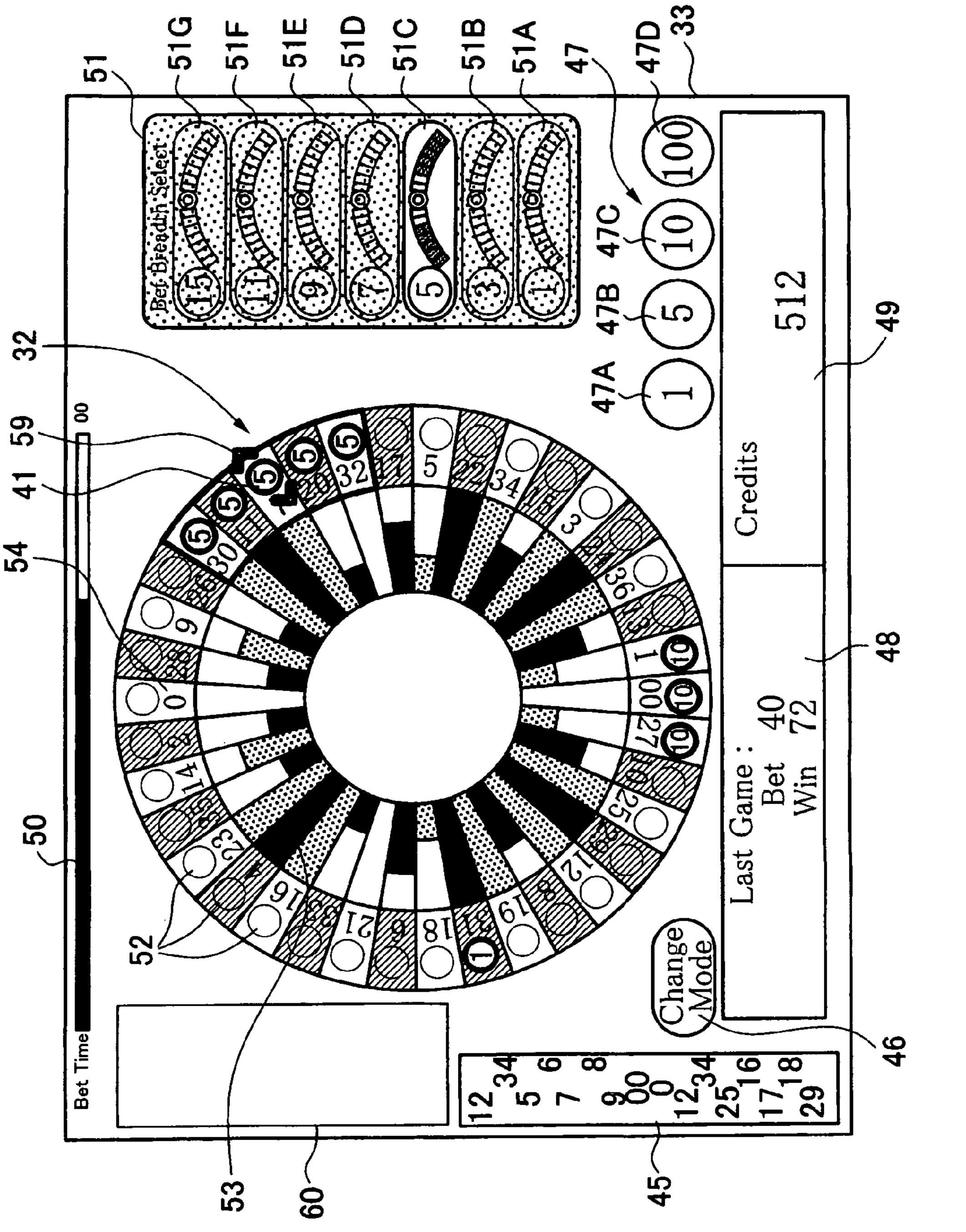
FIG. 6 is a schematic representation of a second BET screen where a wheel betting board is displayed according to the embodiment of the invention.

On the other hand, the image display 7 is a touch-panel liquid crystal display with a touch panel 28 attached to the front of the liquid crystal display. The player can press an icon displayed on a liquid crystal screen 29 with a finger, etc., for selecting the icon. FIGS. 3 and 6 are drawings to show examples of display screens displayed on the image display during the gaming.

As shown in FIGS. 3 and 6, during the gaming with the roulette gaming machine 1, the image display 7 displays two types of screens of a first BET screen 31 having a table betting board 30 and a second BET screen 33 having a wheel betting board 32. The display can be switched between the first BET screen 31 and the second BET screen 33 each time a screen switch button 34, 46 displayed on the screen is pressed. After selecting either of the first BET screen 31 and the second BET screen 33, the player can bet chips using his or her credit.

First, the first BET screen 31 will be discussed based on FIG. 3. The same numbers as the numbers 0, 00, and 1 to 36 indicated on the number indication plates 14 are arranged like squares on the table betting board 30 displayed on the first BET screen 31. Special BET areas for the player to bet a chip by specifying "odd number," "even number," "color of number indication plate (red or black), or "given number range (for example, 1 to 12 or the like) are also arranged like squares. BET areas 42 where the same numbers as the numbers 0, 00, and 1 to 36 indicated on the number indication plates 14 are displayed are each made up of a number indication part 42A and an identification indication part 42B. The number indication parts 42A of the BET areas 42 are parts where the same numbers as the numbers 0, 00, and 1 to 36 indicated on the number indication plates 14 are displayed. On the other hand, the identification indication part 42B is a part indicating which of win count BET buttons 43 (described later) corresponds to the area. (See FIG. 5.)

Displayed below the table betting board 30 are a result history display section 35, the above-mentioned screen switch button 34, the win count BET buttons 43, unit BET buttons 36, a payback result display section 37, and a credit count display section 38 from the left to the right of the screen.

The result history display section 35 lists the results of the win numbers in the previous games (one game refers to an operation sequence from the player betting a chip at each satellite 4 to the ball 16 dropping to the ball housing groove 13 to paying out credit based on the win number). When one game is over, a new win number is added to the top of the result history display section 35 for display and the player can check the history of the win numbers of a maximum of 16 games.

The screen switch button 34 is a button for switching between the first BET screen 31 and the second BET screen 33 displayed on the image display 7 as mentioned above. If the player presses the screen switch button 34 on the liquid crystal screen, the first BET screen 31 using the table betting board 30 can be switched to the second BET screen 33 using the wheel betting board 32 for display. Then, the player bets a chip based on the betting board on the current displayed screen.

The win count BET buttons 43 are buttons for the player to bet on any BET area 42 based on the win count for each mark from the game 100 games before to the immediately preceding game. The win count BET buttons 43 will be discussed with reference to FIG. 4.

Figure 4:
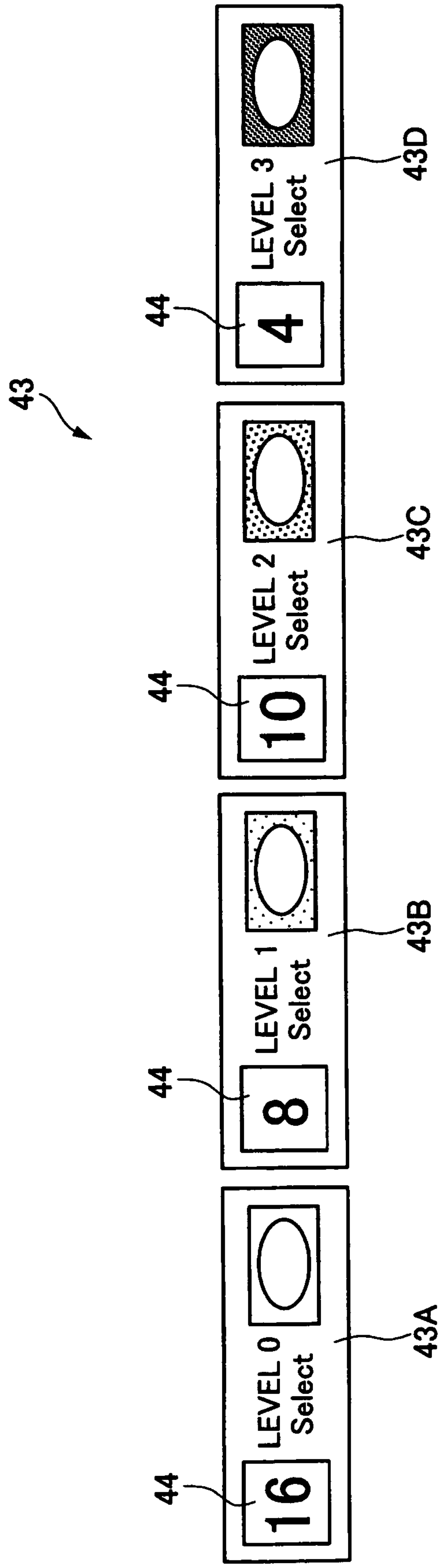
FIG. 4 is an enlarged schematic representation of win count BET buttons provided on the first BET screen.

As shown in FIG. 4, in the roulette gaming machine 1 according to the embodiment, the win count BET buttons 43 are made up of four types of buttons of a level 0 BET button 43A, a level 1 BET button 43B, a level 2 BET button 43C, and a level 3 BET button 43D.

The level 0 BET button 43A is a button for betting on all of the numbers indicated on the number indication plates 14 not becoming a win number at all in the most recent 100 games. The level 1 BET button 43B is a button for betting on all of the numbers indicated on the number indication plates 14 becoming a win number only once in the most recent 100 games. Likewise, the level 2 BET button 43C is a button for betting on all of the numbers indicated on the number indication plates 14 becoming a win number twice in the most recent 100 games. On the other hand, the level 3 BET button 43D is a button for betting on all of the numbers indicated on the number indication plates 14 becoming a win number three times or more in the most recent 100 games.

Each win count BET button 43 is formed on the left with a corresponding count indication part 44 indicating how many numbers correspond to the BET button in the 38 marks (numbers). In the example shown in FIG. 4, in the most recent 100 games, the number of the numbers not becoming a win number at all is 16; the number of the numbers becoming a win number once is 8; the number of the numbers becoming a win number twice is 10; and the number of the numbers becoming a win number three times or more is 4.

Each win count BET button 43 is formed on the right with a legend of the identification indication parts 42B displayed for identifying the BET area 42 corresponding to each win count BET button 43 on the table betting board 30.

Figure 5:
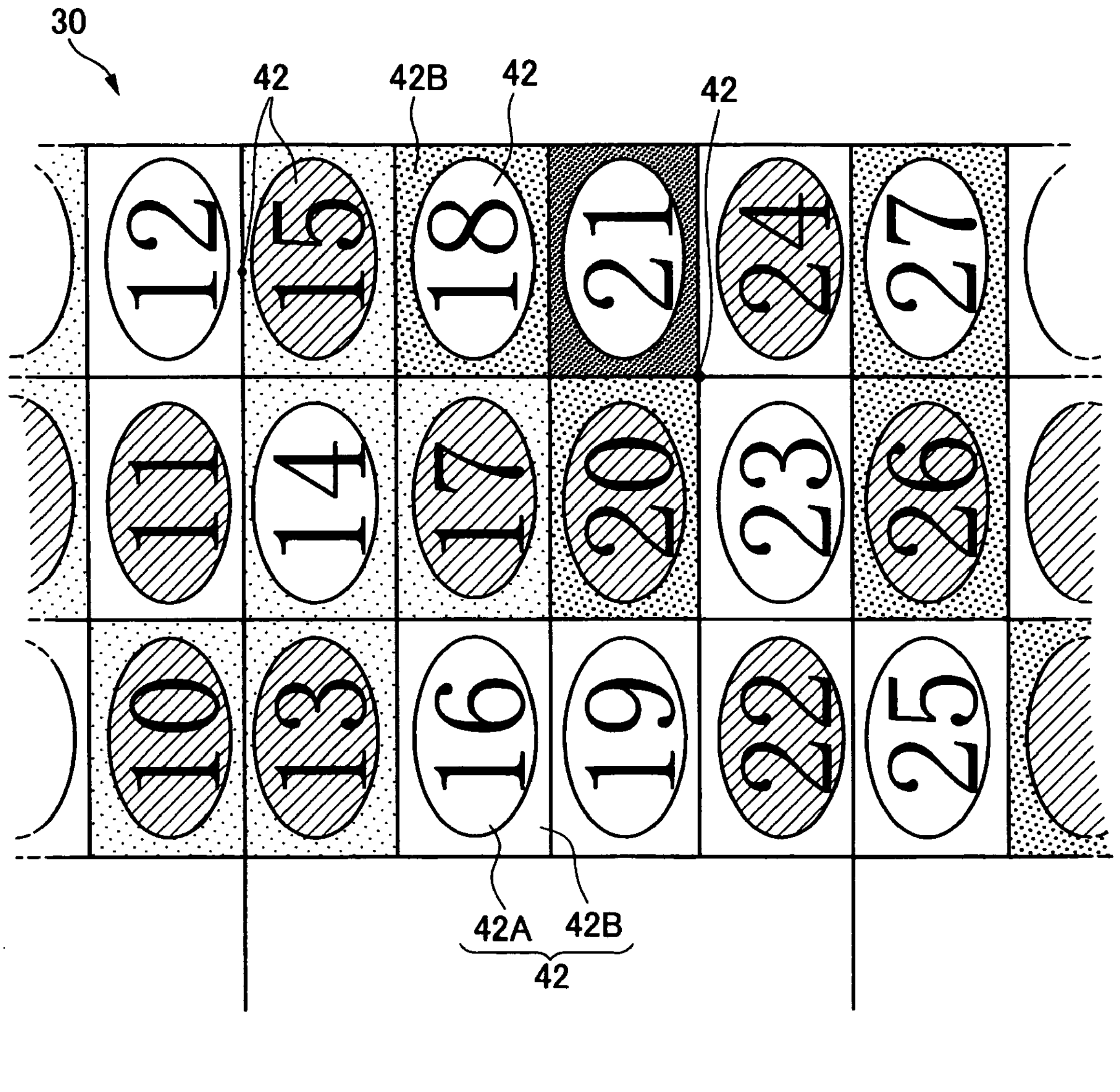
FIG. 5 is a schematic representation of a part of the table betting board on an enlarged scale.

As shown in FIG. 5, on the table betting board 30 according to the embodiment, the BET area 42 corresponding to the level 0 BET button 43A has the identification indication part 42B displayed in green, and the BET area 42 corresponding to the level 1 BET button 43B has the identification indication part 42B displayed in light blue. The BET area 42 corresponding to the level 2 BET button 43C has the identification indication part 42B displayed in yellow, and the BET area 42 corresponding to the level 3 BET button 43D has the identification indication part 42B displayed in pink.

That is, the display color of the identification indication part 42B on the table betting board 30 (for example, green, light blue, yellow, or pink) is displayed in the legend portion of each win count BET button 43. Therefore, if the player bets using the win count BET button 43, the player can also easily understand which BET area 42 to bet on from the table betting board 30.

The unit BET buttons 36 are buttons for the player to select the number of chips to be bet on the BET area 42 (on number or mark square or on square forming line) specified by the player. The unit BET buttons 36 are made up of four types of buttons of a 1-BET button 36A, a 5-BET button 36B, a 10-BET button 36C, and a 100-BET button 36D.

The player first specifies the BET area 42 to bet with a cursor 40 described later by directly pressing the screen with a finger, etc. In this state, if the player presses the 1-BET button 36A, the player bets one chip at a time (the number of bet chips increases from one to two to three to . . . each time the player presses the 1-BET button 36A with a finger, etc.,). If the player presses the 5-BET button 36B, the player bets five chips at a time (the number of bet chips increases from five to 10 to 15 to . . . each time the player presses the 5-BET button 36B with a finger, etc.,). If the player presses the 10-BET button 36C, the player bets 10 chips at a time (the number of bet chips increases from 10 to 20 to 30 to . . . each time the player presses the 10-BET button 36C with a finger, etc.,). Further, if the player presses the 100-BET button 36D, the player can bet 100 chips at a time (the number of bet chips increases from 100 to 200 to 300 to . . . each time the player presses the 100-BET button 36D with a finger, etc.,).

Therefore, to bet a large number of chips, the operation can also be simplified.

The payback result display section 37 displays the number of bet chips of the player in the preceding game and the paid-back credit count. Here, subtracting the number of bet chips from the paid-back credit count results in the credit count newly gained by the player playing the preceding game.

Further, the credit count display section 38 displays the credit count owned by the player at present. When the player bets chips, the credit count is decremented by the number of the bet chips (one credit point per chip). If the number on which the player bets becomes a win number and the credit is paid back, the credit count is incremented by the paid-back credit points. If the credit count owned by the player reaches 0, the game is over.

A BET timer graph 39 is provided at the top of the table betting board 30. The BET timer graph 39 is a graph for indicating the remaining time during which the player can bet, and a red graph extends gradually to the right with the passage of time from the game start time. When the graph extends to the rightmost side, the time during which the player can bet in the current game expires. If the BET timer graph 39 reaches a specific position (for example, position of ⅔), the ball 16 is input into the roulette wheel 4 from the ball input unit of the roulette wheel 4.

A cursor 40 indicating the BET area 42 selected by the player at present is displayed on the table betting board 30. A chip mark 41 indicating the number of chips bet so far and the BET area 42 is also displayed on the table betting board 30. The number displayed on the chip mark 41 denotes the number of bet chips. For example, the chip mark 41 of 7 placed on the square 18 as shown in FIG. 3 indicates that the player bets seven chips on the number 18. The method of betting only on one number is called "straight up."

The chip mark 41 of 1 placed at the intersection of the squares 5, 6, 8, and 9 indicates that the player bets one chip on the four numbers covering 5, 6, 8, and 9. The method of betting covering four numbers is called "corner bet."

Other available bet methods are as follows: "Split bet" for betting a chip covering two numbers on the line between the two numbers; "street bet" for betting a chip covering three numbers (for example, 13, 14, and 15) on the end of a horizontal row of the numbers (in FIG. 3, one row in the vertical direction); "five bet" for betting a chip covering five numbers of 0, 00, 1, 2, and 3 on the line between the numbers 00 and 3; "line bet" for betting a chip covering six numbers (for example, 13, 14, 15, 16, 17, and 18) among numbers of two horizontal rows of the numbers (in FIG. 3, two rows in the vertical direction); "column bet" for betting a chip covering 12 numbers on the square written as "2 to 1;" and "dozen bet" for betting a chip covering 12 numbers on the square written as "1st 12," "2nd 12," or "3rd 12." Further, bet methods each covering 18 numbers depending on the number indication plate color (red or black), odd or even number, whether the number is equal to or less than 18 or is equal to or more than 19 using six squares provided at the bottom stage of the table betting board 30 are also available.

To bet a chip on the first BET screen 31 described above in a general manner, first the player specifies the BET area 42 (on number or mark square or on square forming line) to bet on, on the screen and presses the BET area 42 directly with a finger. Consequently, the cursor 40 moves to the specified BET area 42.

Then, whenever the player presses one of the unit BET buttons 36 (1-BET button 36A, 5-BET button 36B, 10-BET button 36C, 100-BET button 36D), as many chips as the number indicated by the pressed unit BET button are bet on the specified BET area 42. For example, if the player presses the 10-BET button 36C four times, the 5-BET button 36B once, and the 1-BET button 36A three times, a total of 48 chips can be bet.

On the other hand, to bet using the win count BET button 43, the player presses any of the win count BET buttons 43 on the screen. Then, the player presses one of the unit BET buttons 36 (1-BET button 36A, 5-BET button 36B, 10-BET button 36C, 100-BET button 36D), whereby as many chips as the number indicated by the pressed unit BET button are bet on all BET areas 42 corresponding to the pressed win count BET button 43 (level 0 BET button 43A, level 1 BET button 43B, level 2 BET button 43C, level 3 BET button 43D).

Next, the second BET screen 33 will be discussed based on FIG. 6. The same numbers as the numbers 0, 00, and 1 to 36 placed on the number indication plates 14 are displayed on the wheel betting board 32 displayed on the second BET screen 33 according to the same wheel-like arrangement as the actual roulette wheel 4.

Displayed below the wheel betting board 32 are a result history display section 45, the above-mentioned screen switch button 46, unit BET buttons 47, a payback result display section 48, and a credit count display section 49 as with the first BET screen 31 described above. Therefore, the history display section 45, the unit BET buttons 47, the payback result display section 48, and the credit count display section 49 will not be discussed again.

The screen switch button 46 is a button for switching between the first BET screen 31 and the second BET screen 33 displayed on the image display 7 as mentioned above. If the player presses the screen switch button 46 on the liquid crystal screen, the first BET screen 31 using the table betting board 30 can be switched to the second BET screen 33 using the wheel betting board 32 for display. Then, the player bets a chip based on the betting board on the current displayed screen.

A BET timer graph 50 is provided at the top of the wheel betting board 32 on the second BET screen 33 as with the first BET screen 31 described above. The BET timer graph 50 is a graph for indicating the remaining time during which the player can bet, and a red graph extends gradually to the right with the passage of time from the game start time. When the graph extends to the rightmost side, the time during which the player can bet in the current game expires. If the BET timer graph 50 reaches a specific position (for example, position of ⅔), the ball 16 is input into the roulette wheel 4 from the ball input unit of the roulette wheel 4.

Figure 7:
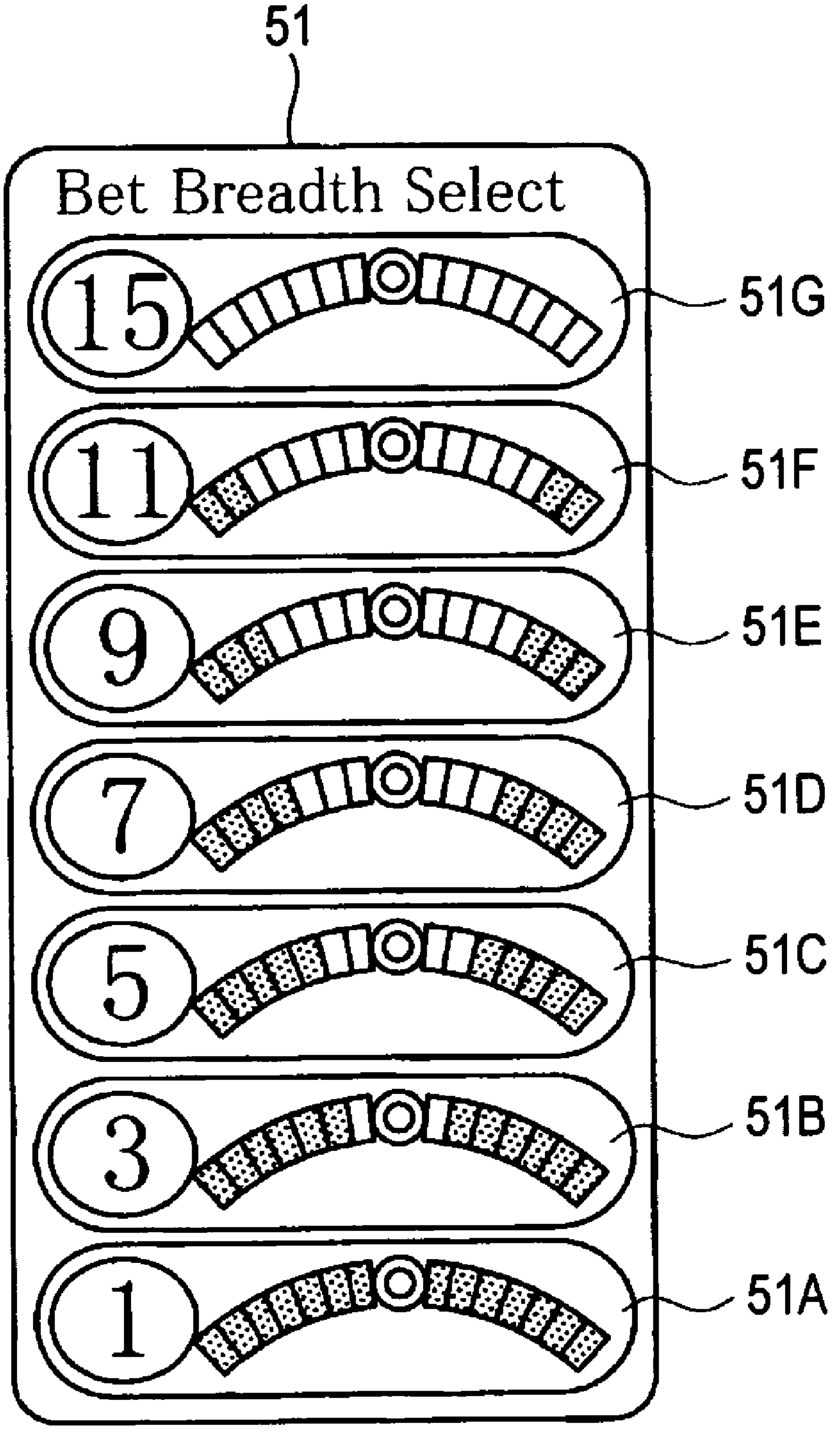
FIG. 7 is a schematic drawing to show a bet width setting section according to the embodiment of the invention on an enlarged scale.

A BET width setting section 51 is provided in the right portion of the wheel betting board 32 on the second BET screen 33. The BET width setting section 51 is a function unique to the wheel betting board 32. If the player sets the bet width in the BET width setting section 51, it is made possible for the player to bet a chip not only on the specified BET area 52, but also on its peripheral BET areas 52. The BET width setting section 51 is made of seven types of buttons of a 1-width setting button 51A, a 3-width setting button 51B, a 5-width setting button 51C, a 7-width setting button 51D, a 9-width setting button 51E, a 11-width setting button 51F, and a 15-width setting button 51G, enabling the player to set the bet width to 1, 3, 5, 7, 9, 11, and 15 respectively. The bet width unit the total number of BET areas containing the selected BET area 52 and the BET areas 52 placed on both sides of the selected BET area 52 on which the player can bet at the same time, as described later. FIG. 7 is a schematic drawing to show the BET width setting section 51 according to the embodiment on an enlarged scale.

As shown in FIG. 7, the 1-width setting button 51A is a button for betting only on the specified BET area 52. The 3-width setting button 51B is a button for betting on a total of three BET areas 52 of the specified BET area 52 and the BET areas 52 of the numbers positioned on both adjacent sides (each one) at the same time. The 5-width setting button 51C is a button for betting on a total of five BET areas 52 of the specified BET area 52 and the BET areas 52 of the numbers positioned on both adjacent sides (each two) at the same time. The 7-width setting button 51D is a button for betting on a total of seven BET areas 52 of the specified BET area 52 and the BET areas 52 of the numbers positioned on both adjacent sides (each three) at the same time. The 9-width setting button 51E is a button for betting on a total of nine BET areas 52 of the specified BET area 52 and the BET areas 52 of the numbers positioned on both adjacent sides (each four) at the same time. The 11-width setting button 51F is a button for betting on a total of 11 BET areas 52 of the specified BET area 52 and the BET areas 52 of the numbers positioned on both adjacent sides (each five) at the same time. The 15-width setting button 51G is a button for betting on a total of 15 BET areas 52 of the specified BET area 52 and the BET areas 52 of the numbers positioned on both adjacent sides (each seven) at the same time.

The player can select one of the bet widths by pressing any desired bet width button and can bet a chip based on the selected bet width (any of 1, 3, 5, 7, 9, 11, or 15).

Figure 8:
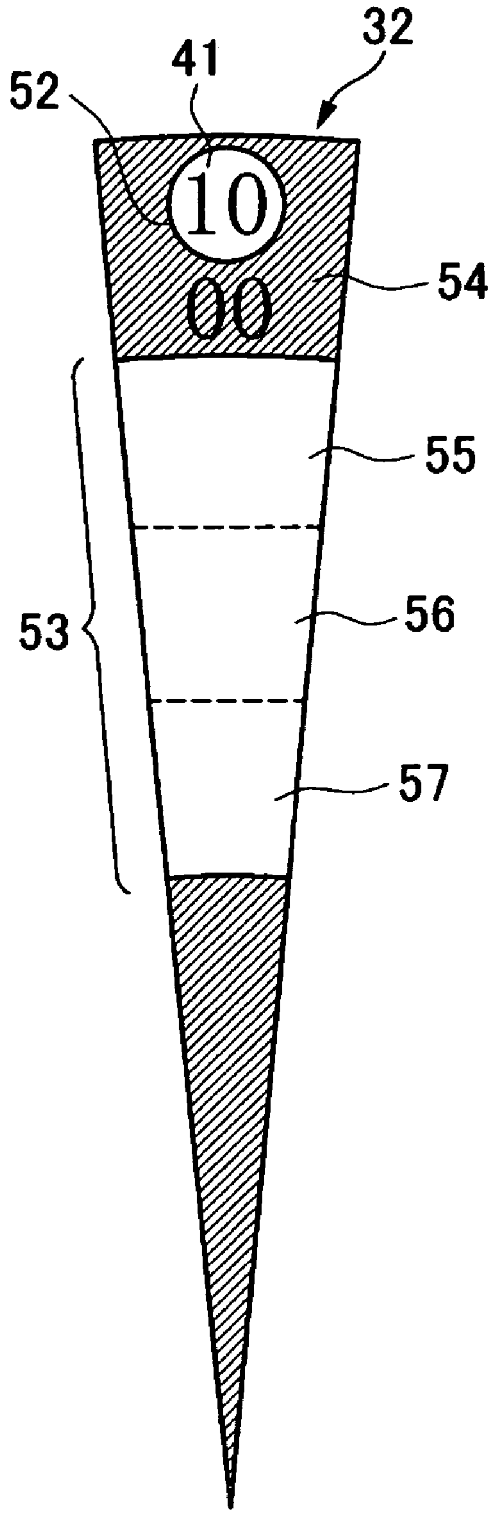
FIG. 8 is a schematic drawing to show a part of the wheel betting board according to the embodiment of the invention on an enlarged scale.

History graphs 53 are provided in a one-to-one correspondence with the BET areas 52 like a wheel inside the circle of number indication parts 54 describing the numbers on the wheel betting board 32 on the second BET screen 33. The history graph 53 is a bar graph so as to enable the player to visually easily understand a history of the corresponding BET area 52 (number) becoming a win number in the past games to the preceding game. FIG. 8 is a schematic drawing to show a part of the wheel betting board on an enlarged scale.

As shown in FIG. 8, the history graph 53 is placed inside the number indication part 54 indicating the number and is made up of three areas of a first graph area 55, a second graph area 56, and a third graph area 57. Each area is lit based on the win number history (win count) (see FIG. 6).

Specifically, when the number became a win number once based on the most recent 100 games, the first graph area 55 of the history graph 53 corresponding to the win number (the BET area 52 of the win number) is lit. When the number became a win number twice, the second graph area 56 of the history graph 53 corresponding to the win number is lit. Further, when the number became a win number three times or more, the third graph area 57 of the history graph 53 corresponding to the win number is lit. Therefore, to know the past game result, the player can visually easily determine what frequency the ball 16 dropped to which position of the roulette wheel 4 at. The numbers are displayed on the wheel betting board 32 displayed on the second BET screen 33 according to the same wheel-like arrangement as the actual roulette wheel 4 as described above, so that the effect is furthermore improved.

In addition to lighting the graph areas 55 to 57, the colors of the graph areas 55 to 57 may be changed from the surroundings, thereby distinguishing the graph areas 55 to 57.

On the other hand, win count BET buttons 60 performing similar functions to those of the win count BET buttons 43 on the first BET screen 31 are provided in the left portion of the wheel betting board 32 on the second BET screen 33. The win count BET buttons 60 will be discussed with reference to FIG. 9.

Figure 9:
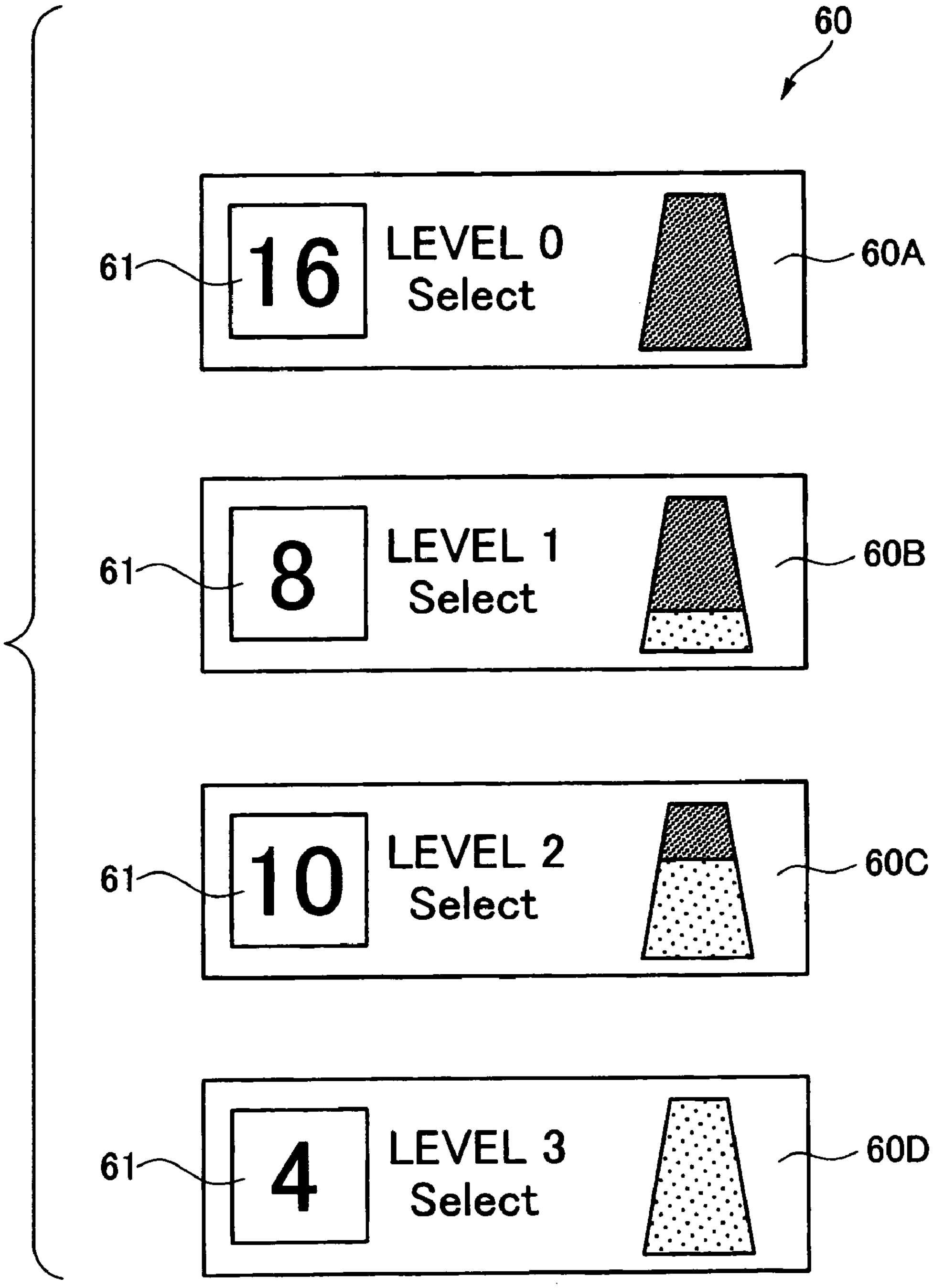
FIG. 9 is en enlarged schematic representation of win count BET buttons provided on the second BET screen.

As shown in FIG. 9, the win count BET buttons 60 are made up of four types of buttons like the win count BET buttons 43 on the first BET screen 31; a level 0 BET button 60A, a level 1 BET button 60B, a level 2 BET button 60C, and a level 3 BET button 60D are arranged from the top to the bottom on the second BET screen 33.

Like the level 0 BET button 43A, the level 0 BET button 60A is a button for betting on all of the numbers indicated on the number indication plates 14 not becoming a win number at all in the most recent 100 games. Like the level 1 BET button 43B, the level 1 BET button 60B is a button for betting on all of the numbers indicated on the number indication plates 14 becoming a win number only once in the most recent 100 games.

Like the level 2 BET button 43C, the level 2 BET button 60C is a button for betting on all of the numbers indicated on the number indication plates 14 becoming a win number twice in the most recent 100 games. Like the level 3 BET button 43D, the level 3 BET button 60D is a button for betting on all of the numbers indicated on the number indication plates 14 becoming a win number three times or more in the most recent 100 games.

Each win count BET button 60 is formed on the left with a corresponding count indication part 61 indicating how many numbers correspond to the BET button in the 38 marks (numbers). In the example shown in FIG. 9, in the most recent 100 games, the number of the numbers not becoming a win number at all is 16; the number of the numbers becoming a win number once is 8; the number of the numbers becoming a win number twice is 10; and the number of the numbers becoming a win number three times or more is 4.

Each win count BET button 60 is formed on the right with a legend to schematically show the history graphs 53 displayed on the wheel betting board 32.

As shown in FIG. 9, the display modes of the history graphs 53 correspond to the win count BET buttons 60 on the wheel betting board 32 according to the embodiment. That is, the number not becoming a win number at all in the most recent 100 games corresponds to the level 0 BET button 60A, and none of the first graph area 55 to the third graph area 57 of the history graph 53 on the wheel betting board 32 are lit. Therefore, the state in which the history graph 53 is not lit is displayed in the legend of the level 0 BET button 60A.

The number becoming a win number once in the most recent 100 games corresponds to the level 1 BET button 60B, and only the first graph area 55 of the history graph 53 is lit. Therefore, the state in which only the first graph area 55 of the history graph 53 is lit is displayed in the legend of the level 1 BET button 60B.

The number becoming a win number twice in the most recent 100 games corresponds to the level 2 BET button 60C, and the first graph area 55 and the second graph area 56 of the history graph 53 are lit. Therefore, the state in which the first graph area 55 and the second graph area 56 of the history graph 53 are lit is displayed in the legend of the level 2 BET button 60C.

The number becoming a win number three times or more in the most recent 100 games corresponds to the level 3 BET button 60D, and the first graph area 55, the second graph area 56, and the third graph area 57 of the history graph 53 are all lit. Therefore, the state in which the first graph area 55, the second graph area 56, and the third graph area 57 of the history graph 53 are all lit is displayed in the legend of the level 3 BET button 60D.

Thus, the mode in which the history graph 53 on the wheel betting board 32 is lit is displayed in the legend of the win count BET buttons 60 corresponding to the level of each win count BET button 60. Therefore, if the player bets using the win count BET button 60, the player can also easily understand which BET area 52 to bet on from the wheel betting board 32.

A cursor 59 indicating the BET area 52 selected by the player at present is displayed on the wheel betting board 32. A chip mark 41 indicating the number of bet chips and the selected BET area 52 so far is also displayed on the wheel betting board 32. The number displayed on the chip mark 41 denotes the number of bet chips. For example, the chip mark 41 of 1 placed on the square 31 as shown in FIG. 6 indicates that the player bets one chip on the number 31.

To make a usual bet ("straight up" on the table betting board 30) on the second BET screen 33 described above, first the player specifies the BET area 52 to bet on (the number indicated on the number indication part 54) on the screen and presses the area (the number) directly with a finger. Consequently, the cursor 59 moves to the specified BET area 52.

The player presses one of the unit BET buttons 47 (1-BET button 47A, 5-BET button 47B, 10-BET button 47C, 100-BET button 47D), thereby betting as many chips as the number indicated by the unit BET button on the specified BET area 52.

To bet using the BET width setting section 51, first the player specifies the BET area 52 to bet on (the number indicated on the number indication part 54) on the screen and presses the area (the number) directly with a finger, thereby specifying the BET area 52 as the center of the bet width.

Then, the player specifies any desired bet width by pressing any of the 1-width setting button 51A, the 3-width setting button 51B, the 5-width setting button 51C, the 7-width setting button 51D, the 9-width setting button 51E, the 11-width setting button 51F, or the 15-width setting button 51G of the BET width setting section 51. The player presses one of the unit BET buttons 47 (1-BET button 47A, 5-BET button 47B, 10-BET button 47C, 100-BET button 47D), thereby betting as many chips as the number indicated by the unit BET button on the specified BET area 52 (if the player specifies the bet width other than 1, on a plurality of BET areas 52 at the same time).

On the other hand, to bet using the win count BET button 60 on the second BET screen 33, the player presses any of the win count BET buttons 60 on the screen. Then, the player presses one of the unit BET buttons 47 (1-BET button 47A, 5-BET button 47B, 10-BET button 47C, 100-BET button 47D), thereby betting as many chips as the number indicated by the unit BET button on all BET areas 52 corresponding to the pressed win count BET button 60 (level 0 BET button 60A, level 1 BET button 60B, level 2 BET button 60C, level 3 BET button 60D).

Figure 10:
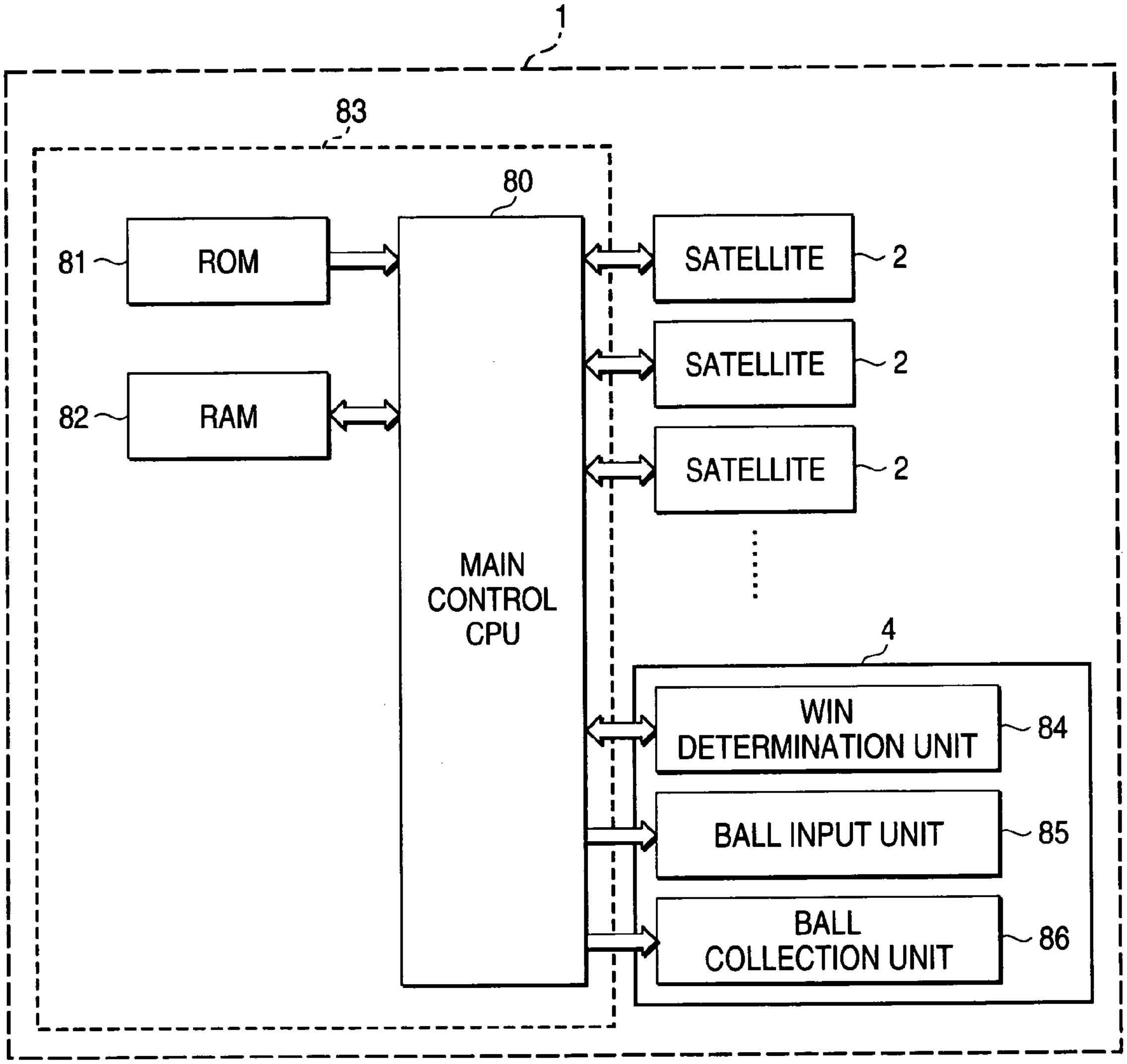
FIG. 10 is a block diagram to schematically show a control system of the roulette gaming machine according to the embodiment of the invention.

Next, the configuration of a control system of the roulette gaming machine 1 will be discussed based on FIG. 10. FIG. 10 is a block diagram to schematically show the control system of the roulette gaming machine 1.

As shown in FIG. 10, the roulette gaming machine 1 is made up of a main control section 83 including a main control CPU 80, ROM 81, and RAM 82 and the roulette wheel 4 and the 10 satellites 2 connected to the main control section 83 (see FIG. 1). The control system of the satellite 2 is described later in detail.

The main control CPU 80 performs various types of processing based on input signals, etc., supplied from the satellites 2 and data and programs stored in the ROM 81 and the RAM 82, and transmits instruction signals to the satellites 2 based on the processing result, thereby controlling the satellites 2 under the initiative of the main control CPU 80 for advancing games. Further, the main control CPU 80 controls a win determination unit 84, a ball input unit 85, and a ball collection unit 86 installed in the roulette wheel 4 for inputting the ball 16 into the roulette wheel 4, collecting the ball 16 from the roulette wheel 4, and determining the win number corresponding to the ball housing groove 13 into which the ball 16 drops.

The ROM 81 is implemented as semiconductor memory, etc., for example, and stores a program for providing the basic function of the roulette gaming machine 1, a program for controlling the units in the roulette wheel 4, the odds for the BET area 42, 52 (the credit payout number of chips responsive to a win), a program for controlling the satellites 2 under the initiative of the main control CPU 80, and the like.

On the other hand, the RAM 82 temporarily stores chip bet information supplied from the satellites 2, the win number data determined by the win determination unit 84, data concerning the result of the processing executed by the main control CPU 80, and the like. The RAM 82 also stores the game result of the most recent 100 games (for example, the win numbers) as the history data.

The win determination unit 84, the ball input unit 85, and the ball collection unit 86 installed in the roulette wheel 4 are also connected to the main control CPU 80. If the bet time of the player at each satellite 2 reaches one time, namely, if the BET timer graph 39, 65 of the first BET screen 31, the second BET screen 33 reaches a specific position (for example, position of ⅔), the ball input unit 85 is driven for inputting the ball 16 into the roulette wheel 4.

Further, when the rotation speed of the ball 16 gradually reduces and the ball 16 loses the centrifugal force, rolls down the slope of the frame 11, and is housed in any ball housing groove 13, the win determination unit 84 determines the number described on the number indication plate 14 corresponding to the ball housing groove 13 in which the ball 16 is housed, and transmits the determination result to the main control CPU 80. Then, the ball collection unit 86 is driven for collecting the ball 16 from the top of the roulette wheel 4.

Figure 11:
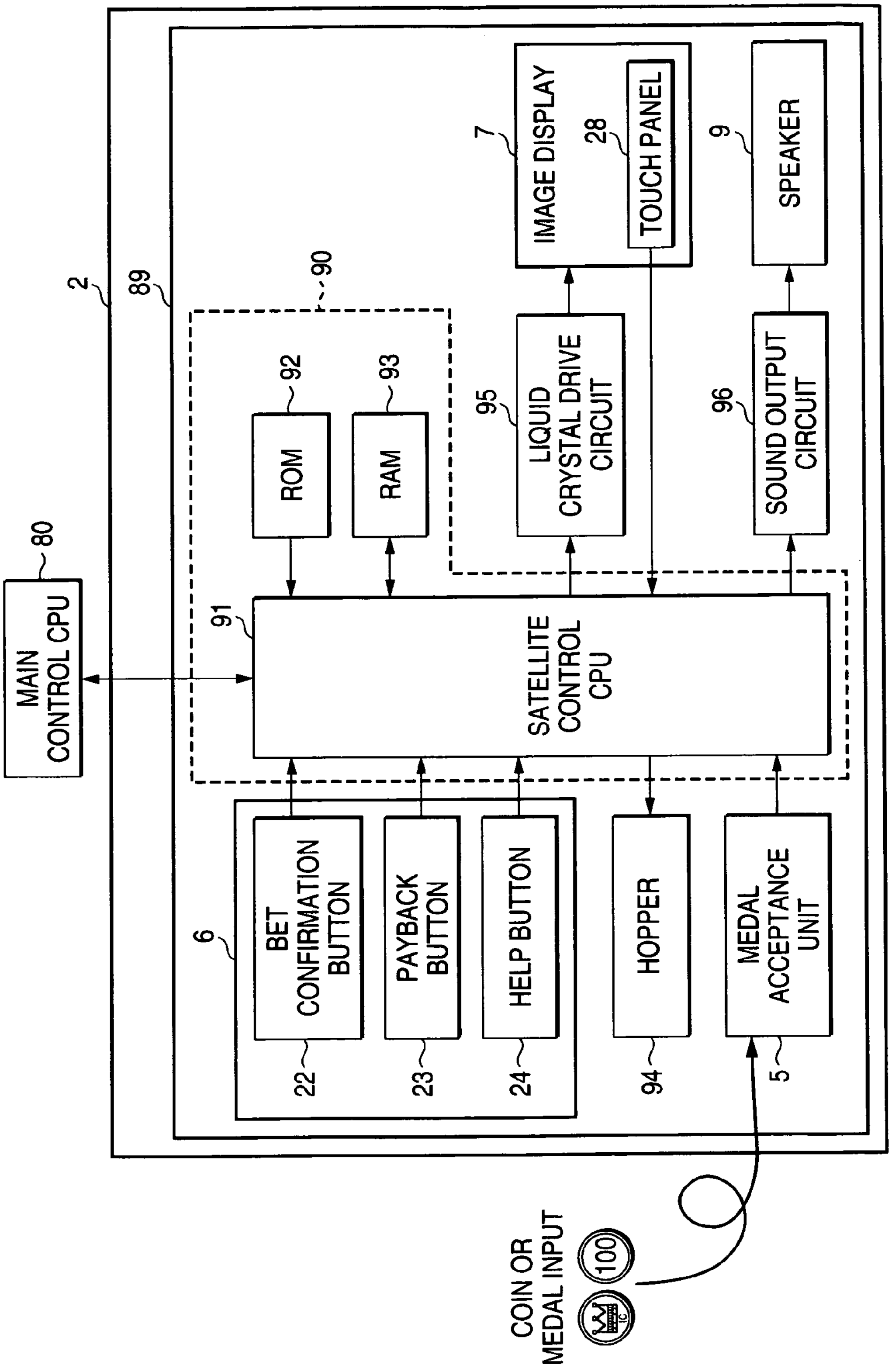
FIG. 11 is a block diagram to schematically show a control system of a satellite according to the embodiment of the invention.

Next, the configuration of the control system of the satellite 2 connected to the main control CPU 80 will be discussed based on FIG. 11. FIG. 11 is a block diagram to schematically show the control system of the satellite according to the embodiment. The 10 satellites 2 basically have the same configuration and therefore in the description to follow, one satellite 2 is taken as an example.

As shown in FIG. 11, the satellite 2 is basically made up of a main body 89 in which the image display 7 and the like are installed and the medal acceptance unit 5 attached to the main body 89. Further, the main body 89 is made up of a satellite control section 90 and several peripheral machines. The satellite control section 90 is made up of a satellite control CPU 91, ROM 92, and RAM 93. The ROM 92 is implemented as semiconductor memory, etc., for example, and stores a program for providing the basic function of the satellite 2, various programs required for controlling the satellite 2, a data table, and the like. The RAM 93 is memory for temporarily storing various pieces of data on which operations are performed by the satellite control CPU 91, the current credit count owned by the player, the chip bet state of the player, the history data of the win numbers of the most recent 100 games, and the like.

The BET confirmation button 22, the payback button 23, and the help button 24 placed on the control section 6 (see FIG. 1) are connected to the satellite control CPU 91. Based on an operation signal output as each button is pressed, etc., the satellite control CPU 91 controls the satellite to execute the corresponding operation. Specifically, the satellite control CPU 91 executes various types of processing based on an input signal supplied from the control section 6 in response to entry of operation of the player and the data and the programs stored in the ROM 92 and the RAM 93, and transmits the processing result to the main control CPU 80 of the roulette gaming machine 1 described above.

On the other hand, the satellite control CPU 91 receives an instruction signal from the main control CPU 80 and controls the peripheral machines making up the satellite 2 for advancing the roulette game in the satellite 2. The satellite control CPU 91 executes various types of processing based on an input signal supplied from the control section 6 in response to entry of operation of the player and the data and the programs stored in the ROM 92 and the RAM 93 depending on the processing type. The satellite control CPU 91 controls the peripheral machines making up the satellite 2 for advancing the roulette game in the satellite 2 based on the processing result. Which method the processing is to be performed according to is determined for each processing in response to the processing type. For example, medal payout processing responsive to the win number corresponds to the former type of processing and bet operation processing of the player on the first BET screen 31 or the second BET screen 33 corresponds to the latter type of processing.

A hopper 94 is also connected to the satellite control CPU 91. The hopper 94 pays out a predetermined number of medals to the player from the medal payout opening 8 (see FIG. 1) in response to an instruction signal from the satellite control CPU 91.

Further, the image display 7 is connected via a liquid crystal drive circuit 95 to the satellite control CPU 91. The liquid crystal drive circuit 95 is made up of program ROM, image ROM, an image control CPU, work RAM, a VDP (video display processor), video RAM, etc. The program ROM stores an image control program and various selection tables concerning display on the image display 7. The image ROM stores dot data to form images displayed on the image display 7, for example. The image control CPU determines the image to be displayed on the image display 7 from the dot data previously stored in the image ROM in accordance with the image control program previously stored in the program ROM based on a parameter set in the satellite control CPU 91. The work RAM is implemented as a temporary storage unit for the image control CPU to execute the image control program. The VDP forms an image responsive to the display determined by the image control CPU and outputs the image to the image display 7. The video RAM is implemented as a temporary storage unit for the VDP to form an image.

The touch panel 28 is attached to the front of the image display 7 as mentioned above, and operation information of the touch panel 28 is transmitted to the satellite control CPU 91. Through the touch panel 28, the player bets chips on the first BET screen 31 or the second BET screen 33. Specifically, the player operates the touch panel 28 in selecting the BET area 42, 52, operating the screen switch button 34, 46, and the unit BET button 36, 47, pressing each bet width setting button (51A to 51G) of the BET width setting section 51, pressing each button of the win count BET buttons 43, 60, and the like, and touch panel operation information is transmitted to the satellite control CPU 91. Based on the information, the bet information of the current player is stored in a bet information storage area 93A of the RAM 93 whenever necessary. Further, the bet information is transmitted to the main control CPU 80.

Further, a sound output circuit 96 and the above-mentioned speaker 9 are connected to the satellite control CPU 91. The speaker 9 generates various effect sounds in making various effects based on output signals from the sound output circuit 96.

The medal acceptance unit 5 is also connected to the satellite control CPU 91. The medal acceptance unit 5 is a unit into which the player inputs game media of coins, medals, etc., in playing a game, as mentioned above.

The medal acceptance unit 5 transmits a credit signal of information concerning the added credit count based on the input game media of coins, medals, etc., to the satellite control CPU 91. The satellite control CPU 91 increments the credit count of the player stored in an owned credit count storage area 93B of the RAM 93 based on the transmitted credit signal.

Figure 12:
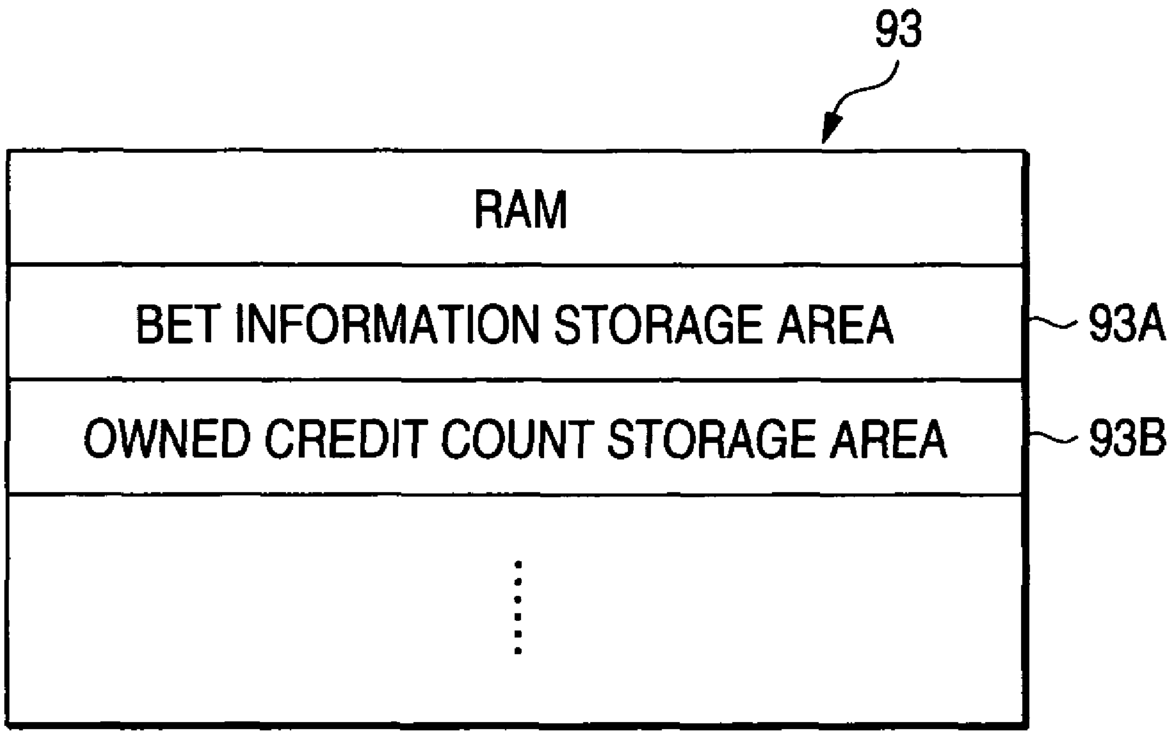
FIG. 12 is a schematic drawing to show storage areas of RAM included in the satellite according to the embodiment of the invention.

As shown in FIG. 12, the RAM 93 is provided with the bet information storage area 93A for storing the bet information of the current player and the owned credit count storage area 93B for storing the credit count owned by the player at present.

Figure 13:
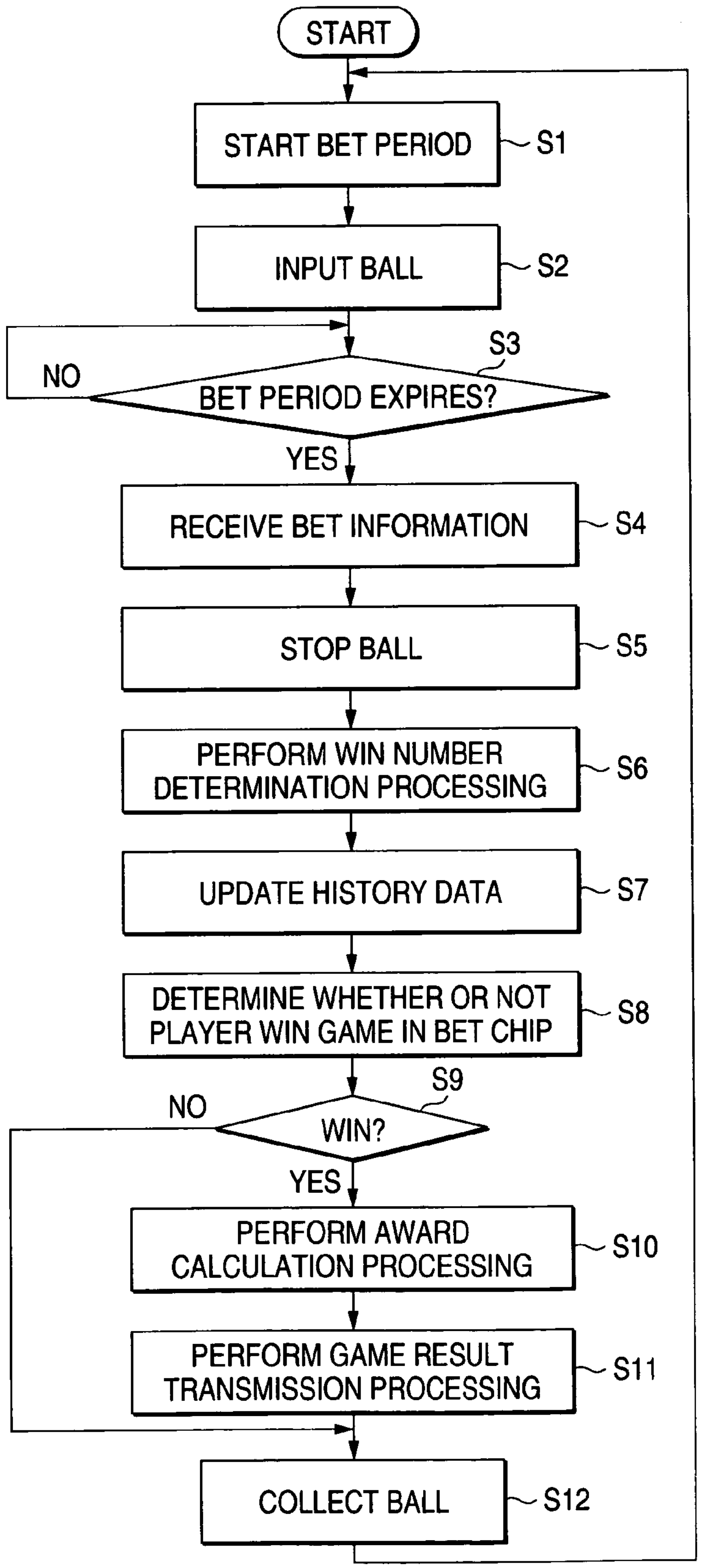
FIG. 13 is a flowchart of a main processing program of the roulette gaming machine according to the embodiment of the invention.

Subsequently, a main processing program in the roulette gaming machine 1 will be discussed based on FIG. 13. FIG. 13 is a flowchart of the roulette game processing program in the roulette gaming machine 1. The program shown in the flowchart of FIG. 13 is stored in the ROM 81 and the RAM 82 included in the roulette gaming machine 1 and is executed by the main control CPU 80.

When the power of the roulette gaming machine 1 according to the embodiment is turned on, first the first BET screen 31 shown in FIG. 3 is displayed on the image display 7 of each satellite 2, enabling the player to bet a chip. Any other player can join the game on the way, and the roulette gaming machine 1 according to the embodiment allows a maximum of 10 players to play a game.

That is, as the power of the roulette gaming machine 1 is turned on, the main processing program in the roulette gaming machine 1 is executed and the bet period of the acceptance period during which each player can bet on any desired BET area 42, 52 is started (S1). When the bet period is started, in the BET timer graph 39, 50 for indicating the remaining time of the period during which the player can bet, a red graph extends gradually to the right with the passage of time. Each player joining the game can operate the touch panel 28 during the bet period to switch between the first BET screen 31 and the second BET screen 33 and bet his or her chip on the BET area 42, 52 associated with the number predicted by the player (see FIGS. 3 and 6). The specific bet methods using the first BET screen 31 and the second BET screen 33 are already described and therefore will not be discussed again.

The ball input unit 85 is driven for inputting the ball 16 into the roulette wheel 4 (S2) based on the fact that a predetermined time (in the embodiment, the time until the position of ⅔ of the BET timer graph 39, 50 is reached) has elapsed since the start of the bet period (S1).

Next, whether or not the bet period expires is determined at S3. The bet period is displayed with the BET timer graph 39, 50. The red graph extends gradually to the right with the passage of time from the game period start time (S1). When the graph extends to the rightmost side, the bet period in the current game expires.

Before the bet period expires (NO at S3), bet is accepted continuously until the bet period expires. On the other hand, if the bet period expires (YES at S3), a bet end signal is output to the satellite control sections 90 of all satellites 2 and an image to the effect that the bet period expires is displayed on the liquid crystal screen 29 of each satellite 2, disabling each player from performing bet operation on the touch panel 28.

The main control CPU 80 terminates the bet period and outputs a bet end signal to all satellites 2 (YES at S3) and then receives bet information of the player at each satellite 2 (specified BET area 42, 52 and the number of bet chips on the specified BET area 42, 52) (S4) and stores the bet information in the RAM 82. If the player does not bet on any BET area 42, 52 at the satellite 2, the main control CPU 80 receives information to the effect that no BET area 42, 52 is specified and information indicating that the number of bet chips is 0 as the bet information.

While S3 and S4 are executed, when the ball 16 input at S2 rolls on the top of the roulette wheel 4 along the guide wall 18 and then the rotation speed of the ball 16 gradually reduces and the ball 16 loses the centrifugal force, the ball 16 rolls down the slope of the frame 11 to the inside and arrives at the rotating rotation disk 12 (see FIG. 2).

The ball 16 rolls on the rotation disk 12 and is housed in any ball housing groove 13 through the top of the number indication plate 14 outside the rotating rotation disk 12, and stops (S5). The number described on the number indication plate 14 corresponding to the ball housing groove 13 in which the ball 16 is housed (any of 0, 00, 1-36) becomes the win number.

Subsequently, after the ball 16 is housed in the ball housing groove 13, the main control CPU 80 drives the win determination unit 84 for determining which number the ball 16 is housed in the ball housing groove 13 corresponding to (S6).

At S7, the history data of the game result (win numbers) of the most recent 100 games stored in the RAM 82 is updated. That is, the number data determined the win number at S6 is added to the history data and the oldest win number data is deleted from the history data. After the history data of the most recent 100 games is updated, the process goes to S8.

Further, the main control CPU 80 determines whether or not the player at each satellite 2 wins the game in the bet chip from the bet information at each satellite 2 received at S4 and the win number determined at S6 (S8).

Whether or not the player at at least one satellite 2 wins the game in the bet chip is determined based on the win determination at S8 (S9) If it is determined that the player at at least one satellite 2 wins the game in the bet chip (YES at S9), the main control CPU 80 executes award calculation processing (S10). In the award calculation processing, the win chip is recognized for each satellite 2 and the total award amount of credit paid out to the player at each satellite 2 is calculated using the odds for each BET area 42, 52 stored in the ROM 81 (the credit count paid out per chip) Subsequently, the process goes to S11.

On the other hand, if it is determined that none of the players at the satellites 2 win the game in the bet chip (NO at S9), the process goes to S12.

At S11, game result transmission processing of transmitting signals involved in payout of credit based on the award calculation processing at S10 and display change accompanying determination of the win number is executed. To payout credit to the player at the satellite 2, the main control section 83 outputs the credit data corresponding to the award amount to the satellite control section 90 of the satellite 2 of the winning player. The credit data is added to the RAM 93 of the satellite 2 of the winning player.

On the other hand, since the history data stored in the RAM 82 is updated at S7, the display change signals of the image display 7 accompanying the history data update are transmitted to all satellites 2. Specifically, signals for changing the color of the identification indication part 42B on the first BET screen 31, increasing or decreasing the history graph 53 on the second BET screen 33, and updating the display of the result history display section 35, 45 are transmitted. At this time, the history data stored in the RAM 82 is also transmitted to all satellites 2.

At S12, the ball collection unit 86 installed below the rotation disk 12 is driven for collecting the ball 16 on the rotation disk 12. The collected ball 16 will again be input to the roulette wheel 4 in the later game. Then, the process returns to S1 for another game.

Figure 14:
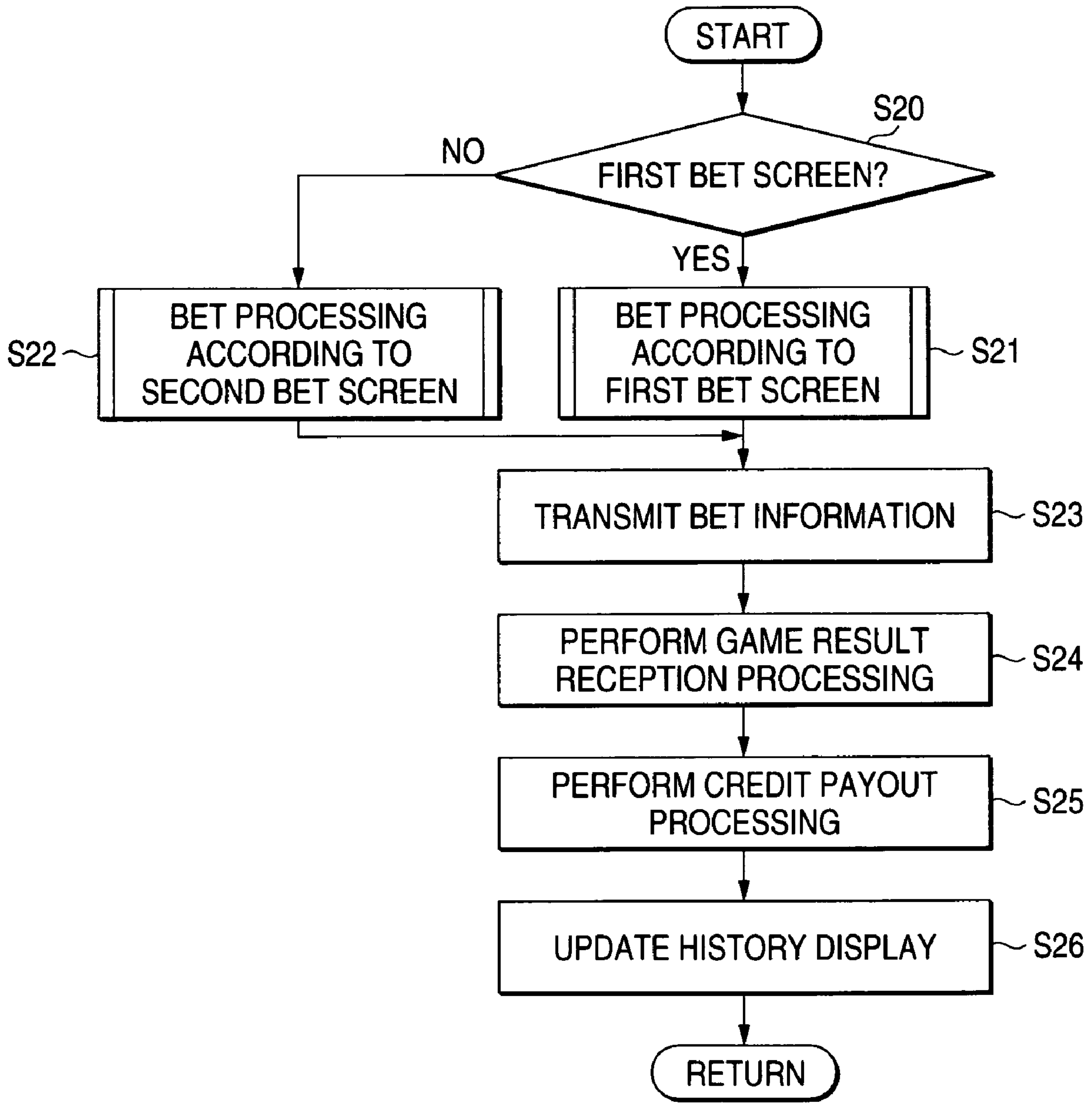
FIG. 14 is a flowchart of a main processing program executed in the satellite.

Subsequently, a main processing program in the satellite 2 will be discussed based on FIG. 14. FIG. 14 is a flowchart of the main processing program in the satellite. The program shown in the flowchart of FIG. 14 is stored in the ROM 92 and the RAM 93 included in the satellite 2 and is executed by the satellite control CPU 91.

First, at S20, the satellite control CPU 91 determines whether or not the current screen displayed on the image display 7 is the first BET screen 31. To switch between the first BET screen 31 and the second BET screen 33, the player can press the screen switch button 34, 46 as described above.

If the first BET screen 31 is displayed (YES at S20), chip bet processing according to the first BET screen 31 is performed (S21). On the other hand, if the first BET screen 31 is not displayed (NO at S20), namely, if the second BET screen 33 is displayed, chip bet processing according to the second BET screen 33 is performed (S22). The bet processing on the first BET screen 31 (S21) and the bet processing on the second BET screen 33 (S22) are described later in detail.

Subsequently, at S23, the result of bet information provided in the bet processing at S21 or S22 (specified BET area 42, 52, specified bet width (applied only to the second BET screen 33), specified bet count) is transmitted to the main control CPU 80 of the main control section 83 (see FIG. 8).

On the other hand, the main control CPU 80 of the roulette gaming machine 1 stores the transmitted bet information in the RAM 82 as described above (S4). The bet information transmitted to the main control CPU 80 is stored in the bet information storage area 93A of the RAM 93 in the bet processing at S21 or S22.

Then, in the roulette gaming machine 1, a game is started with the roulette wheel 4 and the win determination unit 84 (see FIG. 8) determines the win number corresponding to the ball housing groove 13 into which the ball 16 drops.

At S24, the win number determined in the roulette gaming machine 1, the credit count paid out to the player at each satellite 2, and the history data stored in the RAM 82 are received, and the received history data is stored in the RAM 93.

At this time, as the win number is confirmed, the history data is updated and thus the satellite 2 also receives the display change signals of the image display 7 accompanying the history data update. Specifically, the satellite 2 receives the signals for changing the color of the identification indication part 42B on the first BET screen 31, increasing or decreasing the history graph 53 on the second BET screen 33, and updating the display of the result history display section 35, 45.

Subsequently, credit is paid out to the player based on the information received at S24 and the credit owned by the player at present is incremented (S25). The credit count stored in the owned credit count storage area 93B of the RAM 93 is changed and at the same time, the payback result display section 37, 38 indicating the balance of the credit in the preceding game and the credit count display section 38, 49 indicating the current credit count, displayed on the image display 7 (see FIGS. 3 and 6) are updated. The player can know the credit owned by the player at present, etc., by checking the display section 37, 38, 48, 49.

The history display of the win numbers on the first BET screen 31 and the second BET screen 33 is updated. Specifically, the color of the identification indication part 42B on the first BET screen 31 is changed, the history graph 53 on the second BET screen 33 is increased or decreased, and the display of the result history display section 35, 45 is updated.

In the result history display sections 35 and 45 changed common to the first BET screen 31 and the second BET screen 33, the results of the win numbers in the past games to the preceding game are listed. At the time, when one game is over, the new win number is added to the top of the list and the player can check the win number history of a maximum of 16 games.

The identification indication parts 42B changed in display on the first BET screen 31 are placed in a one-to-one correspondence with the BET areas 52 each inside the number indication part 54 indicating the number (see FIG. 5) and are parts of the BET areas 42 where the same numbers as the numbers 0, 00, and 1 to 36 are displayed, namely, the identification indication part 42B results from excluding the number indication part 42A from the BET area 42. The identification indication part 42B corresponding to the number becoming a win number (BET area 42) once in the most recent 100 games is changed in display color to light blue based on the display change signal received at S24. The identification indication part 42B corresponding to the number becoming a win number twice is changed in display color to yellow. Further, the identification indication part 42B corresponding to the number becoming a win number three or more is changed in display color to pink.

On the other hand, the history graphs 53 changed in display on the second BET screen 33 are placed in a one-to-one correspondence with the BET areas 52 each inside the number indication part 54 indicating the number (see FIG. 6) and each history graph 53 is made up of the three areas of the first graph area 55, the second graph area 56, and the third graph area 57 corresponding to each BET area 52. In the history graph 53 corresponding to the number becoming a win number (BET area 52) once in the most recent 100 games based on the win number received at S24, the first graph area 55 corresponding to the win number is lit. In the history graph 53 corresponding to the number becoming a win number twice, the second graph area 56 is lit in addition to the first graph area 55. Further, in the history graph 53 corresponding to the number becoming a win number three times or more, all of the first graph area 55, the second graph area 56, and the third graph area 57 corresponding to the win number are lit.

After the termination of the history display update processing (S26) described above, the main processing program in the satellite 2 is exited.

Figure 15:
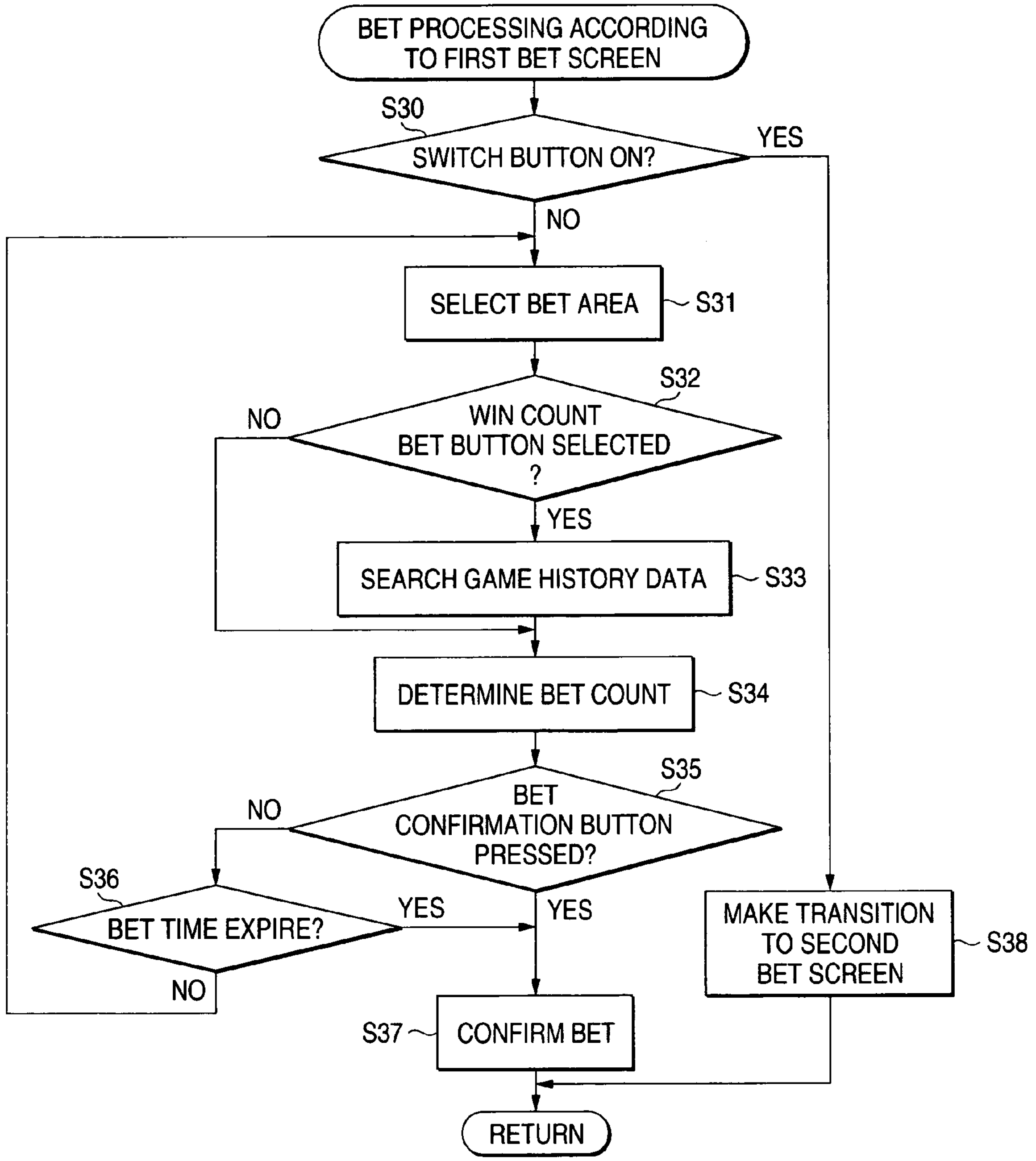
FIG. 15 is a flowchart of a bet processing program based on the first BET screen according to the embodiment of the invention.

Subsequently, the bet processing program on the first BET screen 31 (see FIG. 3) at S21 mentioned above will be discussed based on FIG. 15. FIG. 15 is a flowchart of the bet processing program on the first BET screen 31. The program shown in the flowchart of FIG. 15 is stored in the ROM 92 and the RAM 93 included in the satellite 2 and is executed by the satellite control CPU 91.

First, at S30, the satellite control CPU 91 determines whether or not the screen switch button 34 is pressed. If the screen switch button 34 is pressed (YES at S30), the satellite control CPU 91 goes to the second BET screen 33 (see FIG. 6) (S38). On the other hand, if the screen switch button 34 is not pressed (NO at S30), the satellite control CPU 91 goes to S31.

The table betting board 30 like a conventional table betting board with numbers and marks arranged on squares is displayed on the first BET screen 31, and the player bets a chip based on the table betting board 30 (S31). Bet processing (S31) of usual "straight up," etc., on the first BET screen 31 is already known and therefore will not be discussed again.

Next, at S32, whether or not any of the win count BET buttons 43 displayed on the image display 7 is selected is determined. That is, whether or not any of the level 0 BET button 43A, the level 1 BET button 43B, the level 2 BET button 43C, or the level 3 BET button 43D is selected is determined. If any of the win count BET buttons 43 is selected (YES at S32), the process goes to S33. On the other hand, if no win count BET buttons 43 are selected (NO at S32), the process goes to S34.

All corresponding BET areas 42 of 0, 00, and 1 to 36 are selected in response to the level 0 BET button 43A, the level 1 BET button 43B, the level 2 BET button 43C, or the level 3 BET button 43D selected at S32 are selected.

This processing will be discussed based on the case where the level 1 BET button 43B is selected at S32, for example. The level 1 BET button 43B is a button for betting on all of the BET areas 42 with the numbers becoming a win number only once in the most recent 100 games as described above.

Therefore, at S33, the satellite control CPU 91 searches the history data of the win numbers in the most recent 100 games stored in the RAM 93 for numbers becoming a win number only once and selects all of the BET areas 42 corresponding to the found numbers.

If the level 0 BET button 43A, the level 2 BET button 43C, or the level 3 BET button 43D is selected, likewise the satellite control CPU 91 searches the history data stored in the RAM 93 for numbers not becoming a win number at all, numbers becoming a win number twice, or numbers becoming a win number three times or more and selects all of the BET areas 42 corresponding to the found numbers.

At S34, the number of bet chips (bet count) on each BET area 42 selected at S31 or S33 is set. The player presses one of the unit BET buttons 36 (1-BET button 36A, 5-BET button 36B, 10-BET button 36C, 100-BET button 36D), thereby betting as many chips as the number indicated by the unit BET button on the specified BET areas 42. Chip marks 41 each indicating the number of bet chips and the selected BET area 42 so far are displayed on the table betting board 30, and the number displayed on the chip mark 41 indicates the number of bet chips (see FIG. 3).

Figure 17:
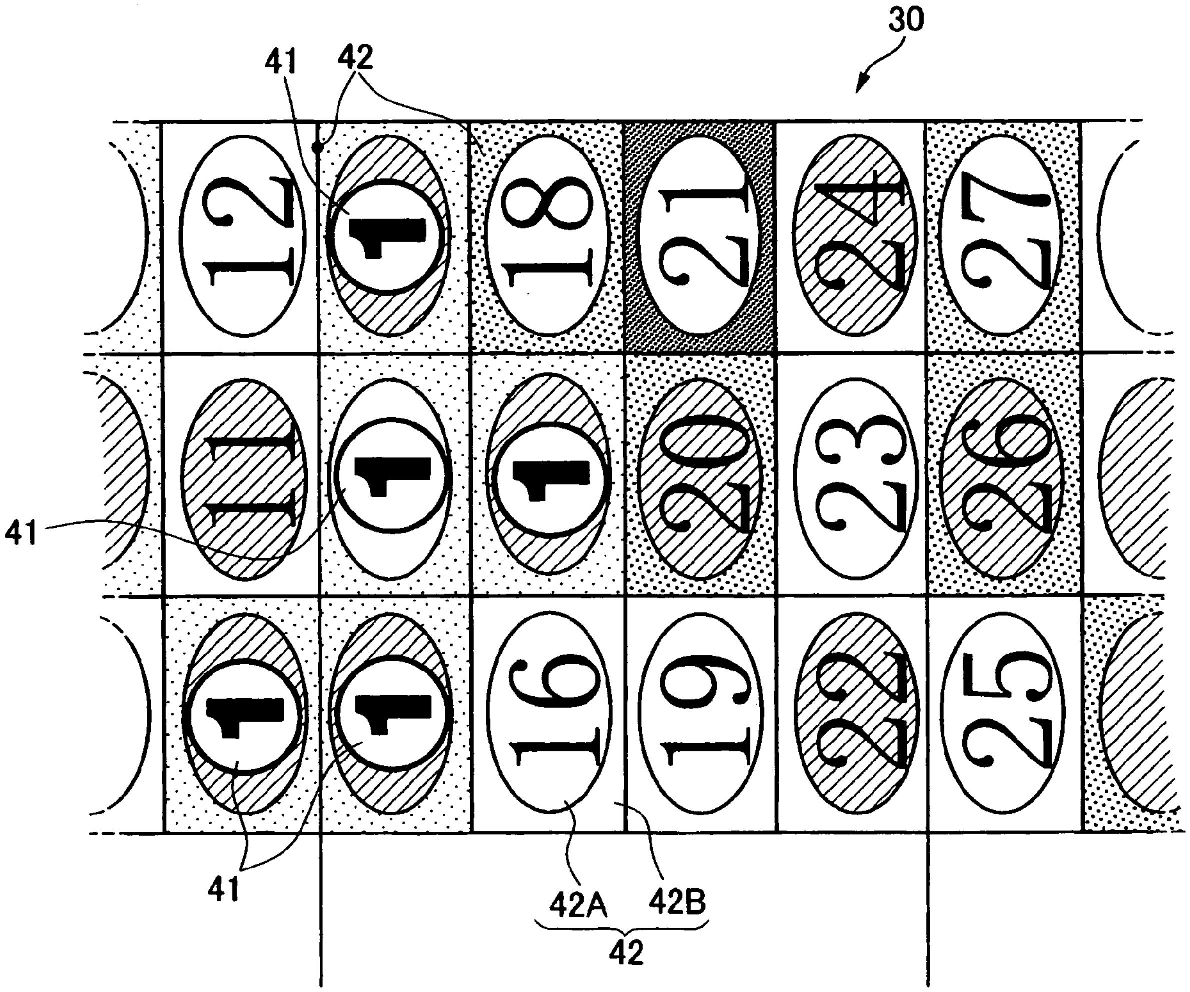
FIG. 17 is a schematic representation of a display screen when the player bet using any win count BET button on the first BET screen.

If the player operates any win count BET button 43 to bet, the chip mark 41 is displayed on the number indication part 42A (see FIG. 17). That is, the player bets on all selected BET areas 42 as "straight up."

The bet information based on the processing (specified BET area 42, specified bet count) is stored in the bet information storage area 93A of the RAM 93 whenever necessary.

Next, at S35, the satellite control CPU 91 determines whether or not the BET confirmation button 22 is pressed. The BET confirmation button 22 is installed in the control section 6 as shown in FIGS. 1 and 9 and is a button pressed by the player to confirm the bet operation sequence at S31 to S34 described above.

If the BET confirmation button 22 is pressed (YES at S35), the bet is confirmed (S37). After the bet is confirmed, the player cannot perform the bet operation at S31 to S34, etc., before the next game is started. After the bet is confirmed, when the player has bet on the number described on the number indication plate 14 corresponding to the ball housing groove 13 in which the ball 16 is housed on the roulette wheel 4 starting the game, the player wins the game. If the player wins the game, the credit points responsive to the number of the bet chips are added to the credit owned by the player at present (S25).

If the BET confirmation button 22 is not pressed (NO at S35), subsequently whether or not the time during which the player can bet expires is determined (S36). The time during which the player can bet is indicated on the BET timer graph 39 provided in the upper portion of the table betting board 30. The BET timer graph 39 is a graph for indicating the remaining time of the period during which the player can bet, and the red graph extends gradually to the right with the passage of time from the game start time. When the graph extends to the rightmost side, the bet time expires.

If the time during which the player can bet does not expire (NO at S36), namely, if the BET timer graph 39 does not yet extend to the rightmost side, the process returns to S31, and again bet processing is made possible. As S31 to S34 described above are repeated, bet processing can be performed on a plurality of points of the table betting board 30.

On the other hand, if the time during which the player can bet expires (YES at S36), the bet is confirmed according to the current bet situation (S37). After the bet is confirmed, the bet processing program according to the first BET screen 31 is exited and the processing routine returns to the main processing program of the satellite 2. After the bet is confirmed, the player cannot perform the bet operation at S31 to S34, etc., before the next game is started.

Figure 16:
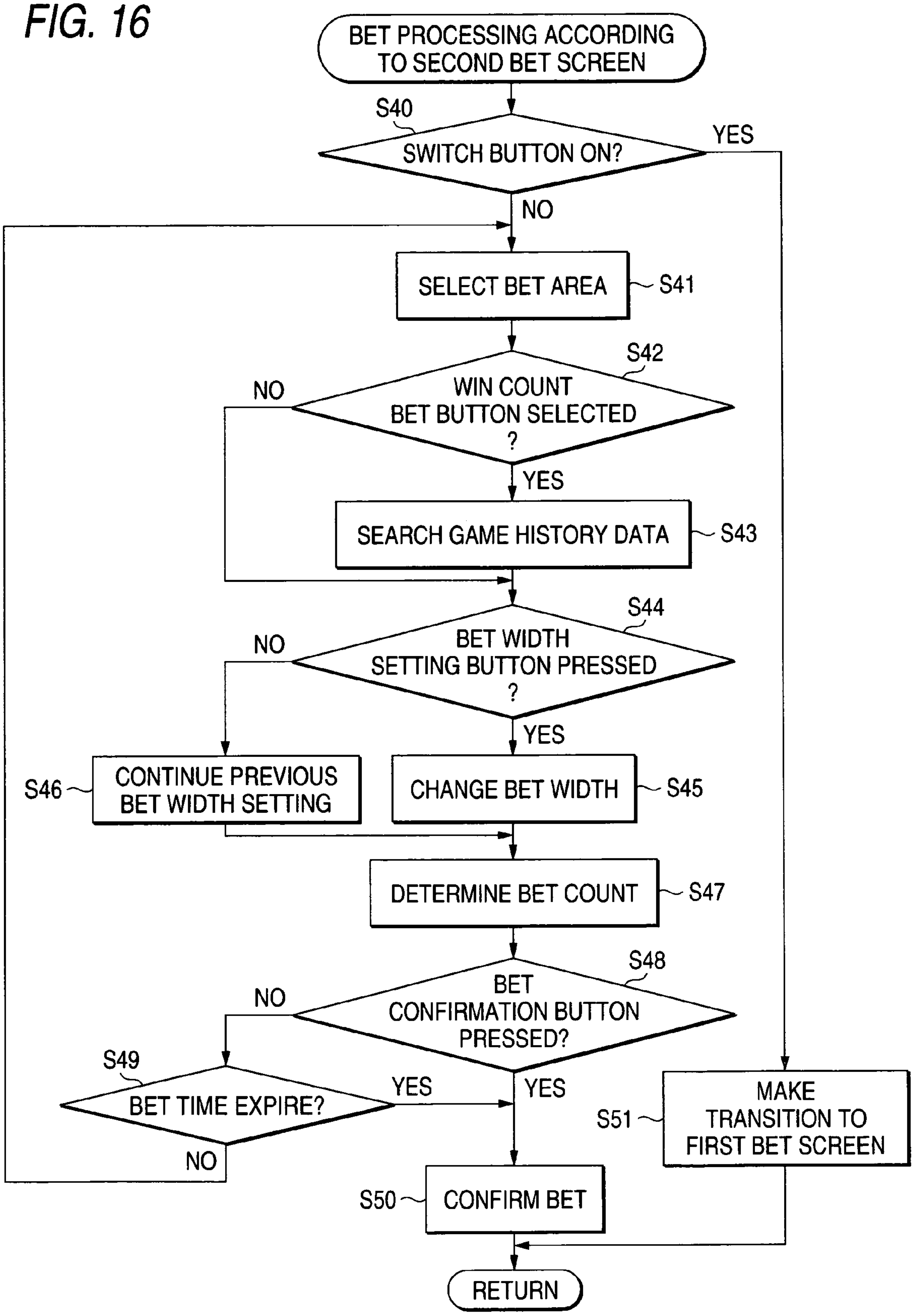
FIG. 16 is a flowchart of a bet processing program based on the second BET screen according to the embodiment of the invention.

Subsequently, the bet processing program on the second BET screen 33 (see FIG. 6) at S22 mentioned above will be discussed based on FIG. 16. FIG. 16 is a flowchart of the bet processing program on the second BET screen 33. The program shown in the flowchart of FIG. 16 is stored in the ROM 92 and the RAM 93 included in the satellite 2 and is executed by the satellite control CPU 91.

First, at S40, the satellite control CPU 91 determines whether or not the screen switch button 46 is pressed. If the screen switch button 46 is pressed (YES at S40), the satellite control CPU 91 goes to the first BET screen 31 (see FIG. 3) (S51). On the other hand, if the screen switch button 46 is not pressed (NO at S40), the satellite control CPU 91 goes to S41.

Next, at S41, the player selects the BET area 52 on which a chip is to be bet according to the wheel betting board 32 displayed on the image display 7. To select the BET area 52, the player uses the touch panel 28 attached to the screen. The player presses the corresponding BET area 52 (on the number indication part 54) with a finger, etc., whereby the cursor 59 moves to the corresponding BET area 52 for selecting the BET area 52. Then, the process goes to S42.

At S42, whether or not any of the win count BET buttons 60 displayed on the image display 7 is selected is determined. That is, whether or not any of the level 0 BET button 60A, the level 1 BET button 60B, the level 2 BET button 60C, or the level 3 BET button 60D is selected is determined. If any of the win count BET buttons 60 is selected (YES at S42), the process goes to S43. On the other hand, if no win count BET buttons 60 are selected (NO at S42), the process goes to S44.

All corresponding BET areas 52 of 0, 00, and 1 to 36 are selected in response to the level 0 BET button 60A, the level 1 BET button 60B, the level 2 BET button 60C, or the level 3 BET button 60D selected at S42 are selected.

This processing will be discussed based on the case where the level 2 BET button 60C is selected at S42, for example. The level 2 BET button 60C is a button for betting on all of the BET areas 42 with the numbers becoming a win number twice in the most recent 100 games as described above.

Therefore, at S43, the satellite control CPU 91 searches the history data of the win numbers in the most recent 100 games stored in the RAM 93 for numbers becoming a win number twice and selects all of the BET areas 52 corresponding to the found numbers.

If the level 0 BET button 60A, the level 1 BET button 60B, or the level 3 BET button 60D is selected, likewise the satellite control CPU 91 searches the history data stored in the RAM 93 for numbers not becoming a win number at all, numbers becoming a win number once, or numbers becoming a win number three times or more and selects all of the BET areas 42 corresponding to the found numbers.

At S44, the satellite control CPU 91 determines whether or not any of the bet width setting buttons 51A to 51G is pressed. The bet width setting buttons are seven types of buttons of the 1-width setting button 51A, the 3-width setting button 51B, the 5-width setting button 51C, the 7-width setting button 51D, the 9-width setting button 51E, the 11-width setting button 51F, and the 15-width setting button 51G provided in the BET width setting section 51 as described above, enabling the player to set the bet width to 1, 3, 5, 7, 9, 11, and 15 respectively.

If any of the bet width setting buttons 51A to 51G is pressed (YES at S44), the bet width is changed to the bet width defined by the pressed bet width setting button (S45). On the other hand, if none of the bet width setting buttons 51A to 51G are pressed (NO at S44), the already setup bet width is continuously applied for betting (S46). Basically, the previous bet width setting continues as the bet width unless the player presses a different bet width setting button from the previously pressed bet width setting button. The bet width is set to 1 in the initial state just after the power is turned on. Then, the process goes to S47.

At S47, to bet on the BET area 52 selected at S41 according to the bet width set at S45 or S46, to bet on the BET area 52 selected at S41, S43, the number of bet chips on the BET area 52 is set. The player presses one of the unit BET buttons 47 (1-BET button 47A, 5-BET button 47B, 10-BET button 47C, 100-BET button 47D), thereby betting as many chips as the number indicated by the unit BET button on the specified BET area 52. When the player sets the bet width using any of the bet width setting buttons 51A to 51G, the player presses one of the unit BET buttons 47 (1-BET button 47A, 5-BET button 47B, 10-BET button 47C, 100-BET button 47D), thereby betting as many chips as the number indicated by the unit BET button on the specified BET area 52 (on a plurality of BET areas 52 at the same time if the bet width is specified other than 1).

Figure 18:
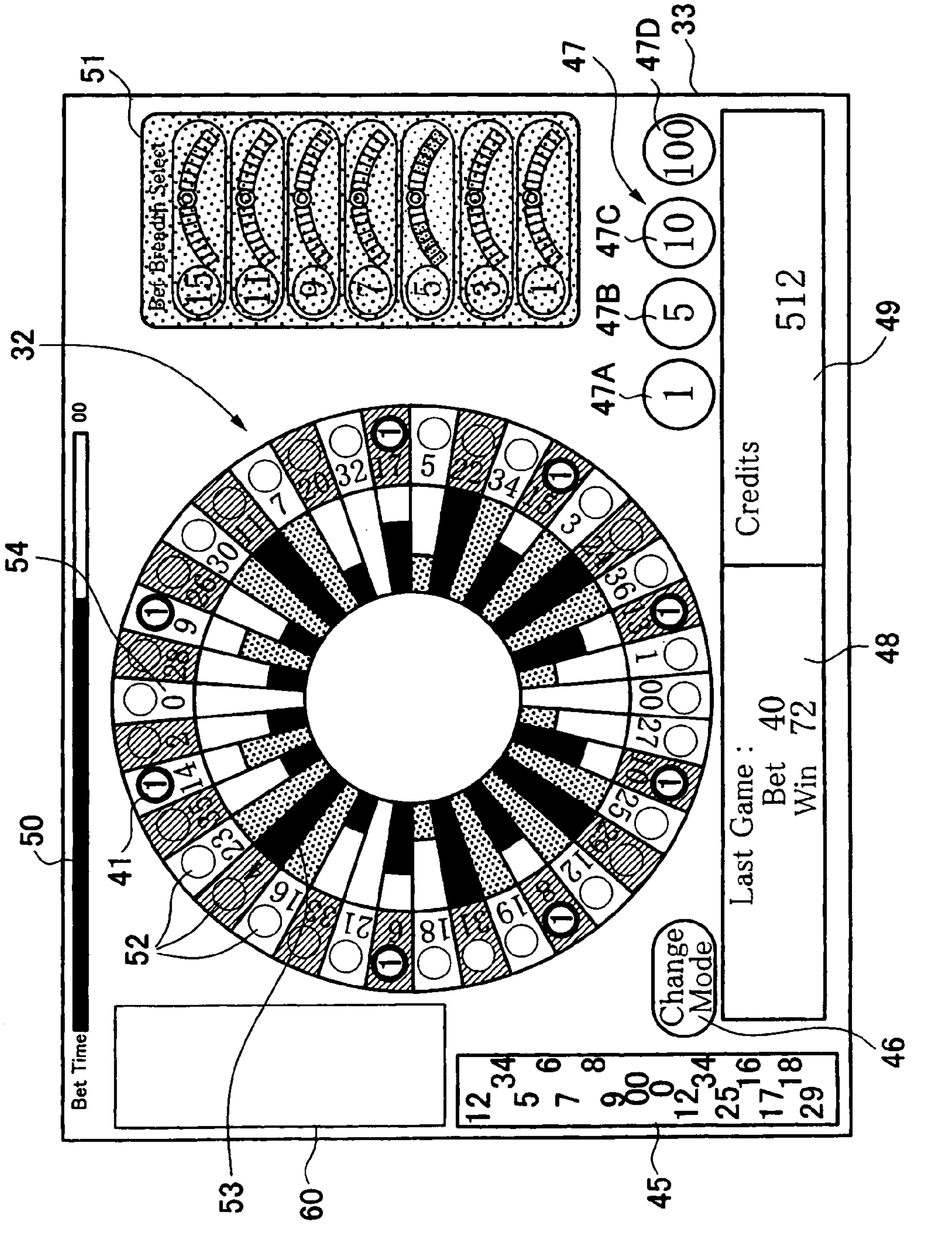
FIG. 18 is a schematic representation of a display screen when the player bet using any win count BET button on the second BET screen.

If the player operates any win count BET button 60 to bet, the chip mark 41 is displayed on the BET area 52 specified at S43 (see FIG. 18). That is, the player bets on all selected BET areas 52 as "straight up."

Chip marks 41 each indicating the number of bet chips and the selected BET area 52 so far are displayed on the wheel betting board 32, and the number displayed on the chip mark 41 indicates the number of bet chips (see FIGS. 4 and 18). The bet information based on the processing (specified BET area 52, specified bet width, specified bet count) is stored in the bet information storage area 93A of the RAM 93 whenever necessary.

Next, at S48, the satellite control CPU 91 determines whether or not the BET confirmation button 22 is pressed. The BET confirmation button 22 is installed in the control section 6 as shown in FIGS. 1 and 9 and is a button pressed by the player to confirm the bet operation sequence at S41 to S47 described above.

If the BET confirmation button 22 is pressed (YES at S48), the bet is confirmed (S49). After the bet is confirmed, the player cannot perform the bet operation at S41 to S47, etc., before the next game is started.

On the other hand, if the BET confirmation button 22 is not pressed (NO at S48), subsequently whether or not the time during which the player can bet expires is determined (S49). The time during which the player can bet is indicated on the BET timer graph 50 provided in the upper portion of the wheel betting board 32. The BET timer graph 50 is a graph for indicating the remaining time of the period during which the player can bet, and the red graph extends gradually to the right with the passage of time from the game start time. When the graph extends to the rightmost side, the bet time expires.

If the time during which the player can bet does not expire (NO at S49), namely, if the BET timer graph 50 does not yet extend to the rightmost side, the process returns to S41, and again bet processing is made possible. As S41 to S47 described above are repeated, bet processing can be performed on a plurality of points of the wheel betting board 32.

On the other hand, if the time during which the player can bet expires (YES at S49), the bet is confirmed according to the current bet situation (S50). After the bet is confirmed, the player cannot perform the bet operation at S41 to S47, etc., before the next game is started.

As described above, in the roulette gaming machine 1 according to the embodiment, the win count BET buttons 43 are provided on the first BET screen 31 where the table betting board 30 is provided and the win count BET buttons 60 are provided on the second BET screen 33 where the wheel betting board 32 is provided, so that the player can bet on all BET areas 42, 52 corresponding to the selected win count from the win number history data in the most recent 100 games. Therefore, the variety of the game entertainment can be increased, so that the player does not lose interest in playing games.

Since the player can select and bet on all of the corresponding BET areas 42, 52 at a time, complicated operation is not required. Accordingly, it is made possible even for the beginner of the roulette gaming machine to easily bet.

Further, the second BET screen 33 is formed with the wheel betting board 32, so that the player can recognize the arrangement of the number indication plates 14 actually displayed on the roulette wheel and the wheel betting board 32 in visual association with each other. Since the history graph 53 is displayed on the wheel betting board 32, it is made possible for the player to predict the bet area to bet on based on the placement of the numbers of the roulette wheel 4 together with the win count for each BET area 52, and the variety of the game entertainment can be increased.

Further, the screen switch button 34 is provided on the first BET screen 31 where the table betting board 30 is provided and the screen switch button 46 is provided on the second BET screen 33 where the wheel betting board 32 is provided, so that the player can switch between the first BET screen 31 and the second BET screen 33 for display by pressing the screen switch button 34, 46 (S12). Accordingly, it is made possible for the players to bet with the table betting board 30 and bet with the wheel betting board 32, so that it is made possible to meet various demands of players.

In the roulette gaming machine 1 according to the embodiment, the player can bet using the win count BET buttons 43, 60 and bet using the BET width setting section 51 on the wheel betting board 32 in addition to the usual bet manner. Therefore, the player can enjoy various game forms and the game will of the player can be increased.

It is to be understood that the invention is not limited to the specific embodiment thereof and various improvements, modifications, and changes may be made without departing from the spirit and the scope of the invention.

For example, in the embodiment, the win count BET buttons 43, 60 apply to the win counts 0, 1, 2, and 3 or more from the win number history in the most recent 100 games, but the win counts corresponding to the buttons are not limited to the numeric values and the buttons may be set to various numeric values of the win counts.

The win number history stored in the RAM 82, 93 is not limited to the history in the most recent 100 games and the win results in a larger number of games may be stored as the history data. For example, the history in the most recent 300 games may be stored. In this case, the win counts assigned to the win count BET buttons 43, 60 are changed to those fitted for the condition, such as 0, 3, 6, and 9 or more.

In the embodiment, the win count BET buttons 43, 60 are designed for selecting the corresponding BET areas 42, 52 based simply on the win count of each number, but the invention is not limited to the mode. For example, the win count BET buttons 43, 60 may assigned the win count ranking, such as the first to tenth places, the 11th to 20th places, 21st to 30th places, and 31st to 38 places in the descending order of the win counts from the win number history data. At this time, when the numbers have become a win number the same number of times, if the newer number is assigned the higher rank, smooth ranking is made possible.

As the win number history data, data of the color determined for each number (for example, red, black, green) may be stored in the RAM 82, 93. In this case, a color specifying button is provided, whereby the win number history data condition can be defined in more detail, so that the bet mode intended by the player can be executed by easy operation.

In the roulette gaming machine according to this embodiment, the bet areas are formed based on the marks placed like a wheel in the same arrangement as the marks placed on the roulette wheel, so that the player can recognize the arrangement of the marks actually displayed on the roulette wheel and the bet areas in visual association with each other. Accordingly, it is made possible for the player to predict the bet area to bet on based on the placement of the marks of the roulette wheel together with the win frequency of each mark, and the variety of the game entertainment can be increased.

In the roulette gaming machine according to this embodiment, the marks placed like a wheel can be changed to the marks placed like squares and the marks placed like squares can be again changed to the marks placed like a wheel, so that the player can bet by selectively displaying the bet areas formed by the marks placed like squares or the bet areas formed by the marks placed like a wheel. Therefore, the arrangement of the marks forming the bet areas can be changed, so that various bet manners with the bet apparatus are made available and it is made possible to provide the game modes meeting various demands of players.

What is claimed is:

1. A roulette gaming machine, comprising:

a roulette wheel on which a plurality of marks is placed;

a lottery unit for drawing a win mark from the plurality of marks;

a bet area display unit comprising a betting board, said betting board comprising a plurality of bet areas formed in a wheel-like arrangement on said betting board, said plurality of bet areas respectively corresponding with said plurality of marks placed on said roulette wheel;

a selection unit for selecting one of said plurality of bet areas displayed on the bet area display unit;

a bet unit for betting a game value on the one of said plurality of bet areas selected by the selection unit;

a history storage unit for storing a plurality of lottery results associated with said plurality of bet areas, said plurality of lottery results being stored as history data;

a search condition selection unit, comprising:

a plurality of win frequency BET buttons allowing a bet based on a search condition concerning a win frequency of said plurality of marks; and a plurality of corresponding count indication parts formed adjacent to said plurality of win frequency BET buttons, said plurality of corresponding count indication parts indicating a number of said plurality of bet areas that correspond to said search condition;

a search unit for searching the history data based on the search condition; and a conditional bet unit for betting the game value on a portion of the plurality of bet areas, said portion of said plurality of bet areas representing a search result of the search unit if the search condition is selected.

2. The roulette gaming machine according to claim 1, further comprising:

a first change unit for changing an arrangement of the plurality of marks forming the plurality of bet areas from said wheel-like arrangement to a square-like arrangement; and a second change unit for changing the square-like arrangement displayed by operating the first change unit to the wheel-like arrangement.

3. The roulette gaming machine according to claim 1, wherein the conditional bet unit is separately located from the search condition selection unit.

4. The roulette gaming machine according to claim 1, wherein the conditional bet unit is located separately from the selection unit and the bet unit.

5. The roulette gaming machine according to claim 1, wherein, if the conditional bet unit is selected, the game value is bet on said portion of the plurality of bet areas, and said portion of the plurality of bet areas satisfies the search condition concerning the win frequency of said plurality of marks.

6. The roulette gaming machine according to claim 1, wherein the search condition selection unit further comprises a plurality of identification indication parts, the plurality of identification indication parts indicating a number of the plurality of bet areas corresponding to the search condition.

7. The roulette gaming machine according to claim 1, wherein the search condition selection unit indicates at least one of said portion of said plurality of bet areas, and wherein, upon selecting the conditional bet unit, the game value is instantaneously bet on said portion of the plurality of bet areas.

8. The roulette gaming machine according to claim 1, wherein the bet unit selects a unit of the game value to bet on the one of said plurality of bet areas.

9. The roulette gaming machine according to claim 8, wherein the bet unit further selects a number of the unit of the game value to bet on the one of said plurality of bet areas.

10. The roulette gaming machine according to claim 1, wherein said betting board further comprises:

a wheel betting board having said plurality of bet areas being formed at an outer edge thereof; and a plurality of history graphs formed in a wheel-like arrangement at an inner edge of said plurality of bet areas to respectively correspond with said plurality of bet areas, each of said plurality of history graphs comprising a plurality of graph areas being illuminated based on said win frequency of said plurality of marks.

* * * * *